United States Patent
Oh et al.

(10) Patent No.: US 11,716,728 B2
(45) Date of Patent: Aug. 1, 2023

(54) METHOD AND APPARATUS FOR TRANSMITTING UPLINK CONTROL SIGNAL IN MOBILE COMMUNICATION SYSTEM

(71) Applicant: SAMSUNG ELECTRONICS CO., LTD., Suwon-si (KR)

(72) Inventors: Jinyoung Oh, Seoul (KR); Jeongho Yeo, Hwaseong-si (KR); Seunghoon Choi, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1053 days.

(21) Appl. No.: 16/086,060

(22) PCT Filed: Mar. 21, 2017

(86) PCT No.: PCT/KR2017/003026
§ 371 (c)(1),
(2) Date: Sep. 18, 2018

(87) PCT Pub. No.: WO2017/064621
PCT Pub. Date: Sep. 28, 2017

(65) Prior Publication Data
US 2020/0295892 A1 Sep. 17, 2020

(30) Foreign Application Priority Data

Mar. 22, 2016 (KR) .................. 10-2016-0034104
Aug. 12, 2016 (KR) .................. 10-2016-0102770

(51) Int. Cl.
*H04W 74/08* (2009.01)
*H04W 72/21* (2023.01)
(Continued)

(52) U.S. Cl.
CPC ........... *H04W 72/21* (2023.01); *H04L 5/0048* (2013.01); *H04L 67/12* (2013.01); *H04W 16/14* (2013.01);
(Continued)

(58) Field of Classification Search
CPC ............ H04W 72/0413; H04W 16/14; H04W 72/044; H04W 74/006; H04W 74/0808;
(Continued)

(56) References Cited

U.S. PATENT DOCUMENTS 10,433,288 B2  10/2019  Yang et al.
2010/0027446 A1  2/2010  Choi et al.
(Continued)

FOREIGN PATENT DOCUMENTS

CN  103444106 A  12/2013
CN  104067545 A  9/2014
(Continued)

OTHER PUBLICATIONS

Written Opinion (PCT/ISA/237) issued by the International Searching Authority in corresponding International Application No. PCT/JP2017/003026, dated Jun. 20, 2017.
(Continued)

*Primary Examiner* — Salvador E Rivas
(74) *Attorney, Agent, or Firm* — Sughrue Mion, PLLC

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety
(Continued)

services. The present invention provides a method for more efficiently transmitting uplink control information and data in a mobile communication system which operates in a non-licensed band or a mobile communication system which requires a channel detection operation.

13 Claims, 11 Drawing Sheets

(51) Int. Cl.
H04L 5/00 (2006.01)
H04W 16/14 (2009.01)
H04L 67/12 (2022.01)
H04W 72/044 (2023.01)

(52) U.S. Cl.
CPC ..... *H04W 72/044* (2013.01); *H04W 74/0808* (2013.01)

(58) Field of Classification Search
CPC ...... H04W 72/21; H04L 5/0048; H04L 67/12; H04L 5/0044; H04L 5/0053; H04L 27/0006
See application file for complete search history.

(56) References Cited

U.S. PATENT DOCUMENTS

| | | | |
|---|---|---|---|
| 2011/0249763 A1* | 10/2011 | Tosato | H04B 7/0641 375/260 |
| 2012/0113827 A1 | 5/2012 | Yamada et al. | |
| 2012/0189075 A1* | 7/2012 | Wang | H04B 7/065 375/267 |
| 2012/0213169 A1* | 8/2012 | Wang | H04B 7/0632 370/329 |
| 2012/0320805 A1* | 12/2012 | Yang | H04L 5/0035 370/280 |
| 2012/0320852 A1* | 12/2012 | Seo | H03M 13/6544 370/329 |
| 2013/0039231 A1 | 2/2013 | Wang | |
| 2013/0039321 A1 | 2/2013 | Kim et al. | |
| 2013/0077542 A1 | 3/2013 | Yang et al. | |
| 2013/0322397 A1 | 12/2013 | Lee et al. | |
| 2014/0029484 A1 | 1/2014 | Choi et al. | |
| 2014/0036853 A1 | 2/2014 | Kim et al. | |
| 2014/0112277 A1* | 4/2014 | Yang | H04L 5/0094 370/329 |
| 2014/0119246 A1 | 5/2014 | Yin et al. | |
| 2014/0321337 A1 | 10/2014 | Kim et al. | |
| 2015/0036566 A1* | 2/2015 | Blankenship | H04W 52/281 370/311 |
| 2015/0156762 A1 | 6/2015 | Hwang et al. | |
| 2015/0181589 A1 | 6/2015 | Luo et al. | |
| 2015/0201431 A1 | 7/2015 | Um et al. | |
| 2015/0223231 A1* | 8/2015 | Noh | H04W 48/00 370/329 |
| 2015/0334699 A1 | 11/2015 | Uchino et al. | |
| 2016/0014797 A1 | 1/2016 | Cheng et al. | |
| 2016/0021664 A1 | 1/2016 | Chou | |
| 2016/0056933 A1* | 2/2016 | Aiba | H04W 72/0406 370/329 |
| 2016/0212649 A1 | 7/2016 | Chen et al. | |
| 2016/0226629 A1 | 8/2016 | Liu et al. | |
| 2016/0278074 A1 | 9/2016 | Yang et al. | |
| 2016/0337841 A1 | 11/2016 | Won et al. | |
| 2017/0215082 A1* | 7/2017 | Hwang | H04W 88/08 |
| 2017/0223640 A1* | 8/2017 | Dinan | H04W 52/246 |
| 2017/0245302 A1* | 8/2017 | Mukherjee | H04W 72/21 |
| 2017/0250781 A1 | 8/2017 | Golitschek Edler Von Elbwart et al. | |
| 2017/0257850 A1* | 9/2017 | Oh | H04W 74/085 |
| 2017/0280440 A1 | 9/2017 | Oh et al. | |
| 2017/0318575 A1 | 11/2017 | Park et al. | |
| 2017/0374679 A1* | 12/2017 | Park | H04W 74/0808 |
| 2018/0049186 A1 | 2/2018 | Hong et al. | |
| 2018/0070352 A1 | 3/2018 | Takeda et al. | |
| 2018/0199369 A1* | 7/2018 | Larsson | H04W 74/0808 |
| 2019/0116498 A1 | 4/2019 | Kim | |
| 2020/0235892 A1 | 7/2020 | Marinier et al. | |

FOREIGN PATENT DOCUMENTS

| | | |
|---|---|---|
| KR | 10-1100445 B1 | 12/2011 |
| KR | 10-2014-0016136 A | 2/2014 |
| KR | 10-2015-0085455 A | 7/2015 |
| KR | 10-2016-0010848 A | 1/2016 |
| KR | 10-2228177 B1 | 3/2021 |
| WO | 2016/036081 A1 | 3/2016 |
| WO | 2016/111582 A1 | 7/2016 |

OTHER PUBLICATIONS

International Search Report (PCT/ISA/210), issued by International Searching Authority in corresponding International Application No. PCT/JP2017/003026, dated Jun. 20, 2017.
International Search Report (PCT/ISA/210), issued by International Searching Authority in corresponding International Application No. PCT/JP2017/003029, dated Jun. 26, 2017.
Qualcomm Incorporated "SRS design details" 3GPP TSG RAN WG1 #84, Feb., 15-19, 2016, St. Julian's, Malta, R1-160887 (pp. 1-4) [retrieved from (http://www.3gpp.org/ftp/tsg_ran/WG1_RL1/TSGR1_84/Docs/].
Ericsson "On UL Channel Access Procedures for Enhanced LAA" 3GPP TSG RAN WG1 Meeting #84, St. Julian's, Malta, Feb. 15-19, 2016, R1-161001 (pp. 1-9) [retrieved from (http://www.3gpp.org/ftp/tsg_ran/WG1_RL1/TSGR1_84/Docs/].
ETRI "Discussion on SRS transmission for eLAA" 3GPP TSG RAN WG1 Meeting #84, St Julian's, Malta, Feb. 15-19, 2016, R1-160992 (pp. 1-5) [retrieved http://www.3gpp.org/ftp/tsg_ran/WG1_RL1/TSGR1_84/Docs/].
NTT Docomo, Inc. "Discussion on SRS design for eLAA UL" 3GPP TSG RAN WG1 Meeting #84, St Julian's, Malta, Feb. 15-19, 2016, R1-160948 (pp. 1-6) [retrieved from (http://www.3gpp.org/ftp/tsg_ran/WG1_RL1/TSGR1_84/Docs/)].
3rd Generation Partnership Project Technical Specification Group Radio Access Network; Evolved Universal Terrestrial Radio Access (E-UTRA); Physical layer procedures (Release 13), 3GPP TS 36.213 V13.0.1 (Jan. 2016) (83 pages total) [retrieved from (https://portal.3gpp.org/desktopmodules/Specifications/SpecificationDetails.aspx?specificationId=2427)].
Samsung "Discussion on PUCCH for UL LAA" 3GPP TSG RAN WG1 Meeting #84; St Julian's, Malta, Feb. 15-19, 2016, R1-160563 (4 pages total) [retrieved from (http://www.3gpp.org/ftp/tsg_ran/WG1_RL1/TSGR1_84/Docs/R1-160563.zip)].
Communication dated Sep. 13, 2019 issued by the United States Patent and Trademark Office in counterpart U.S. Appl. No. 15/466,766.
Communication dated Mar. 26, 2019, issued by the USPTO in counterpart U.S. Appl. No. 15/466,766.
Communication dated Jan. 16, 2019, issued by the European Patent Office in counterpart European Application No. 17770593.6.
ITL, "On the UCI multiplexing for LAA with DL and UL transmission", 3GPP Draft, 3rd Generation Partnership Project (3GPP), May 24, 2015, vol. RAN WG1, Retrieved from: http://www.3gpp.org/ftp/Meetings_3GPP_SYNC/RAN1/Docs/, (3 pages total).
Huawei et al., "UCI transmission for eLAA", 3GPP Draft, 3rd Generation Partnership Project (3GPP), Feb. 6, 2016, vol. RAN WG1, Retrieved from http://www.3gpp.org/ftp/tsg_ran/WG1_RL1/TSGR1_84/Docs/, (2 pages total).
Samsung, "Discussion on UCI transmission for UL LAA", 3GPP Draft, 3rd Generation Partnership Project (3GPP), Feb. 14, 2016, vol. RAN WG1, Retrieved from: http://www.3gpp.org/ftp/Meetings_3GPP_SYNC/RAN1/Docs/, (2 pages total).
Communication dated Sep. 11, 2018 issued by the United States Patent Office in Counterpart U.S. Appl. No. 15/466,766.
Communication dated Mar. 12, 2020 issued by the United States Patent and Trademark Office in U.S. Appl. No. 15/466,766.

(56) References Cited

OTHER PUBLICATIONS

Communication dated Aug. 9, 2022 issued by the Korean Patent Office in Korean Application No. ID-2016-0102770.
Notice of Allowance dated Oct. 3, 2022 issued by the United States Patent and Trademark Office in U.S. Appl. No. 16/936,267.
Samsung, "Discussion on UCI transmission for UL LAA," 3GPP TSG RAN WG1 Meeting #84, R1-160558, Feb. 6, 2016, total 2 pages.
Communication dated Nov. 2, 2021, issued by the China National Intellectual Property Administration in Chinese Application No. 201780012948.0.
Office Action dated Jan. 28, 2022 issued by the United States Patent and Trademark Office in U.S. Appl. No. 16/936,267.

* cited by examiner

METHOD AND APPARATUS FOR TRANSMITTING UPLINK CONTROL SIGNAL IN MOBILE COMMUNICATION SYSTEM

TECHNICAL FIELD

The present disclosure relates to a method and an apparatus for efficiently transmitting uplink control information and data in a mobile communication system that operates in an unlicensed band or in a mobile communication system that requires channel sensing (or listen-before-talk).

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Recently, with the development of Long Term Evolution (LTE) and LTE-Advanced, researches for technology to operate a mobile communication system in an unlicensed band have been actively made, and in particular, channel sensing (or listen-before-talk) may be needed in such an unlicensed band. In this case, there is a need for a method and an apparatus for smoothly operating the mobile communication system in the unlicensed band.

DISCLOSURE OF INVENTION

Technical Problem

An aspect of the present disclosure proposes a method for transmitting uplink data and control information more efficiently by differently configuring a method for transmitting at least one of the uplink data and the control signal information of a terminal in accordance with at least one of whether to transmit an uplink data channel and whether an uplink control signal can be transmitted, the number of empty symbols configured for a channel sensing operation, and whether to configure SRS transmission in a mobile communication system operating in an unlicensed band or in a mobile communication system requiring channel sensing (or listen-before-talk).

Solution to Problem

In accordance with an aspect of the present disclosure, a method by a terminal for transmitting an uplink signal to a base station includes receiving sounding reference signal (SRS) configuration information for transmitting an SRS; receiving uplink transmission configuration information including configuration information for transmitting a signal and configuration information for the terminal to transmit data to the base station in an unlicensed band including information on a channel sensing period; determining whether a symbol configured to transmit the SRS or a symbol in the channel sensing period overlaps a symbol for transmitting uplink control information included in the data to be transmitted based on the SRS configuration information and the uplink transmission configuration information; and transmitting the data and the uplink control information included in the data based on the result of determination.

In accordance with another aspect of the present disclosure, a method by a base station for receiving an uplink signal from a terminal includes transmitting sounding reference signal (SRS) configuration information for transmitting an SRS; transmitting uplink transmission configuration information including configuration information for transmitting a signal and configuration information for the terminal to transmit data to the base station in an unlicensed band including information on a channel sensing period; determining whether a symbol configured to transmit the SRS or a symbol in the channel sensing period overlaps a symbol for transmitting uplink control information included in the data to be transmitted based on the SRS configuration information and the uplink transmission configuration information; and receiving the data and the uplink control information included in the data based on the result of determination.

In accordance with still another aspect of the present disclosure, a terminal transmitting an uplink signal to a base station includes a transceiver configured to transmit and receive signals with the base station; and a controller configured to receive sounding reference signal (SRS) configuration information for transmitting an SRS, control the transceiver to receive uplink transmission configuration information including configuration information for transmitting a signal and configuration information for the terminal to transmit data to the base station in an unlicensed band including information on a channel sensing period, control to determine whether a symbol configured to transmit the SRS or a symbol in the channel sensing period overlaps a symbol for transmitting uplink control information included in the data to be transmitted based on the SRS configuration information and the uplink transmission configuration information, and control the transceiver to transmit the data and the uplink control information included in the data based on the result of determination.

In accordance with yet still another aspect of the present disclosure, a base station receiving an uplink signal from a terminal includes a transceiver configured to transmit and receive signals with the terminal; and a controller configured to transmit sounding reference signal (SRS) configuration information for transmitting an SRS, control the transceiver to transmit uplink transmission configuration information including configuration information for transmitting a signal and configuration information for the terminal to transmit data to the base station in an unlicensed band including information on a channel sensing period, control to determine whether a symbol configured to transmit the SRS or a symbol in the channel sensing period overlaps a symbol for transmitting uplink control information included in the data to be transmitted based on the SRS configuration information and the uplink transmission configuration information, and control the transceiver to receive the data and the uplink control information included in the data based on the result of determination.

Advantageous Effects of Invention

According to the aspects of the present disclosure, since the method for transmitting the uplink data and control signal information of the terminal is differently configured in accordance with at least one of whether to transmit the uplink data channel and whether the uplink control signal can be transmitted, the number of empty symbols configured for the channel sensing operation, and whether to configure the SRS transmission, the uplink data and the control information can be transmitted more efficiently.

MODE FOR THE INVENTION

Figure 1:
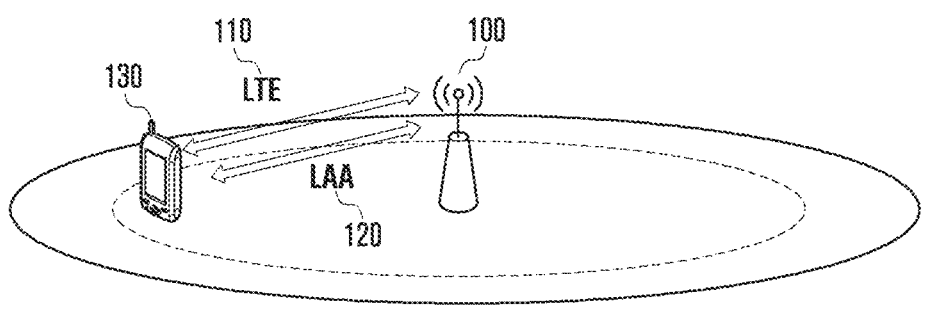
FIGS. 1 and 2 are diagrams illustrating a communication system to which the present disclosure is applied.

Hereinafter, embodiments of the present disclosure will be described in detail with reference to the accompanying drawings. In describing the present disclosure, related well-known functions or configurations incorporated herein are not described in detail in case where it is determined that they obscure the subject matter of the present disclosure in unnecessary detail. Further, terms to be described later are terms defined in consideration of their functions in the present disclosure, but may differ depending on intentions of a user and an operator or customs. Accordingly, they should be defined on the basis of the contents of the whole description of the present disclosure.

The aspects and features of the present disclosure and methods for achieving the aspects and features will be apparent by referring to the embodiments to be described in detail with reference to the accompanying drawings. However, the present disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the present disclosure is only defined within the scope of the appended claims. In the entire description of the present disclosure, the same drawing reference numerals are used for the same elements across various figures.

Recently, a mobile communication system has been developed from an initial mobile communication system that provides voice-oriented services to a high-speed and high-quality wireless packet data communication system that provides data and multimedia services. In order to support such high-speed and high-quality wireless packet data transmission services, various mobile communication standards, such as $3^{rd}$ generation partnership project (3GPP) high speed downlink packet access (HSDPA), high speed uplink packet access (HSUPA), long term evolution (LTE), and long term evolution advanced (LTE-A), 3GPP2 high rate packet data (HRPD), and Institute of Electrical and Electronics Engineers (IEEE) 802.16, have been developed.

In particular, standards development and evolution of LTE/LTE-A/LTE-A-Pro (hereinafter referred to as "LTE") have been continuously repeated to improve system capacity and frequency efficiency. Representatively, an LTE system can greatly increase the data rate and the system capacity in accordance with the usable frequency bandwidth using carrier aggregation (CA) that can operate the system using plural frequency bands. However, the frequency band in which the LTE system currently operates corresponds to a licensed band (or licensed spectrum or licensed carrier) that can be exclusively used by a specific operator that has its own authority. However, in case of general frequency bands (e.g., frequency bands that are equal to or lower than 5 GHz) for providing mobile communication services, other operators or other communication systems have already used them, and thus it is difficult for mobile communication service providers to secure plural licensed frequency bands.

Accordingly, in order to efficiently process mobile data that are explosively being increased in an environment in which it is difficult to secure such licensed frequency bands, technology to make efficient use of an LTE system in an unlicensed band (or unlicensed spectrum or unlicensed carrier) (e.g., LTE in unlicensed (LTE-U) or licensed-assisted access (LAA)) has recently been studied. In an unlicensed band, a specific operator or a specific system does not exclusively use a specific band, but all allowable communication devices share and use the same frequency band. In this case, since 5 GHz unlicensed band is used by a relatively small number of communication devices in comparison to 2.4 GHz unlicensed band, and enables very wide bandwidth to be utilized, it may be one of unlicensed frequency bands that facilitate security of additional frequency bands.

In case of making efficient use of a licensed band and an unlicensed band using LTE technology that aggregates and use plural frequency bands, in other words, carrier aggregation (CA) technology, the system capacity can be easily increased. That is, the LTE system can be operated in a licensed band and an unlicensed band through configuration of an LTE cell in the licensed band as a PCell (or Pcell) and configuration of an LTE cell (or LAA cell or LTE-U cell) in the unlicensed band as an SCell (or Scell or LAA SCell) using the CA technology. In this case, the above-described system can be applied to not only the CA environment in which the licensed band and the unlicensed band are connected through ideal backhaul but also the dual-connectivity environment in which the licensed band and the unlicensed band are connected through non-ideal backhaul. In the present disclosure, explanation will be made on the assumption that the system is applied to the CA environment in which the licensed band and the unlicensed band are connected through the ideal backhaul.

Figure 2:
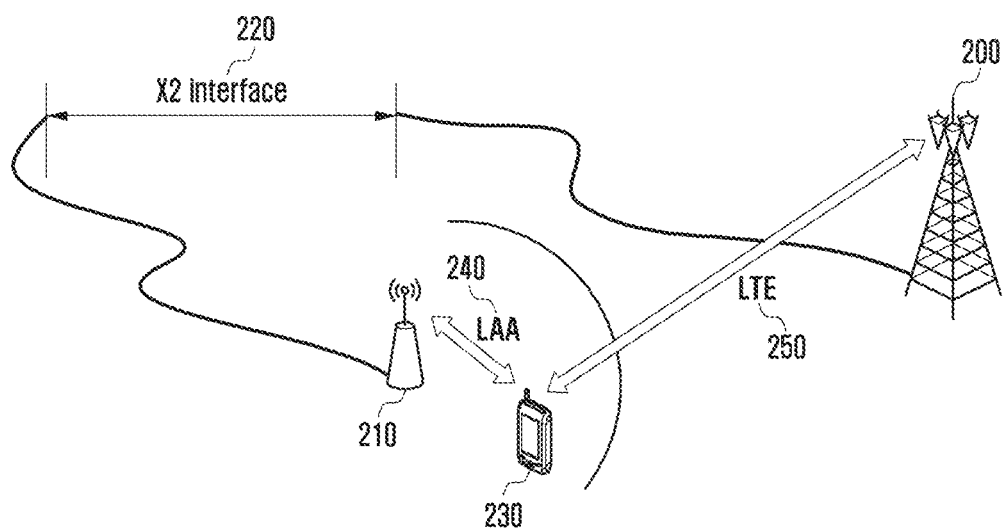

FIGS. 1 and 2 are diagrams illustrating a communication system to which the present disclosure is applied.

Referring to FIG. 1 illustrating a case where an LTE cell 110 and an LAA cell 120 coexist in one small base station 100, a terminal 130 transmits and receives data with the base station 100 through the LTE cell 110 and the LAA cell 120. There is no limit in a duplex type of the LTE cell 110 or the LAA cell 120, but it may be assumed that a cell performing data transmission/reception using a licensed band is an LTE cell 110 or a PCell, and a cell performing data transmission/reception using an unlicensed band is an LAA cell 120 or an SCell. However, in case where the LTE cell is the PCell, it may be limited that uplink transmission can be performed only through the LTE cell 110.

FIG. 2 illustrates a case where an LTE macro base station 200 for wide coverage and an LAA small base station 210 for data rate increase are installed in a network. In this case, there is no limit in a duplex type of the LTE macro base station 200 or the LAA small base station 210. In this case, the LTE macro base station 200 may be replaced by the LTE small base station. Further, in case where the LTE cell is the PCell, it may be configured that uplink transmission can be performed only through the LTE base station 200. In this case, it is assumed that the LTE base station 200 and the LAA base station 210 have an ideal backhaul network. Accordingly, X2 communication 220 becomes possible between fast base stations, and even if the uplink transmission is possible only between the terminal and the LTE base station 200, the LAA base station 210 can receive related control information in real time from the LTE base station 200 through the X2 communication 220. Schemes proposed in the present disclosure can be applied to both the system of FIG. 1 and the system of FIG. 2.

In general, an LTE/LTE-A system is a system that transmits data using an orthogonal frequency division multiple access (OFDM) transmission system. In the OFDM system, a modulation signal is located in 2D resources that are composed of time and frequency. Resources on the time axis are discriminated from each other through different OFDM symbols, and are orthogonal to each other. Resources on the frequency axis are discriminated from each other through different subcarriers, and are also orthogonal to each other.

That is, in the OFDM system, one minimum unit resource may be indicated through designation of a specific OFDM symbol on the time axis and designation of a specific subcarrier on the frequency axis, and may be called a resource element (hereinafter, "RE"). Different REs have the characteristics of being orthogonal to each other even if they pass through frequency selective channels, and thus signals that are transmitted on the different REs can be received in the reception side without generating mutual interference.

Figure 3:
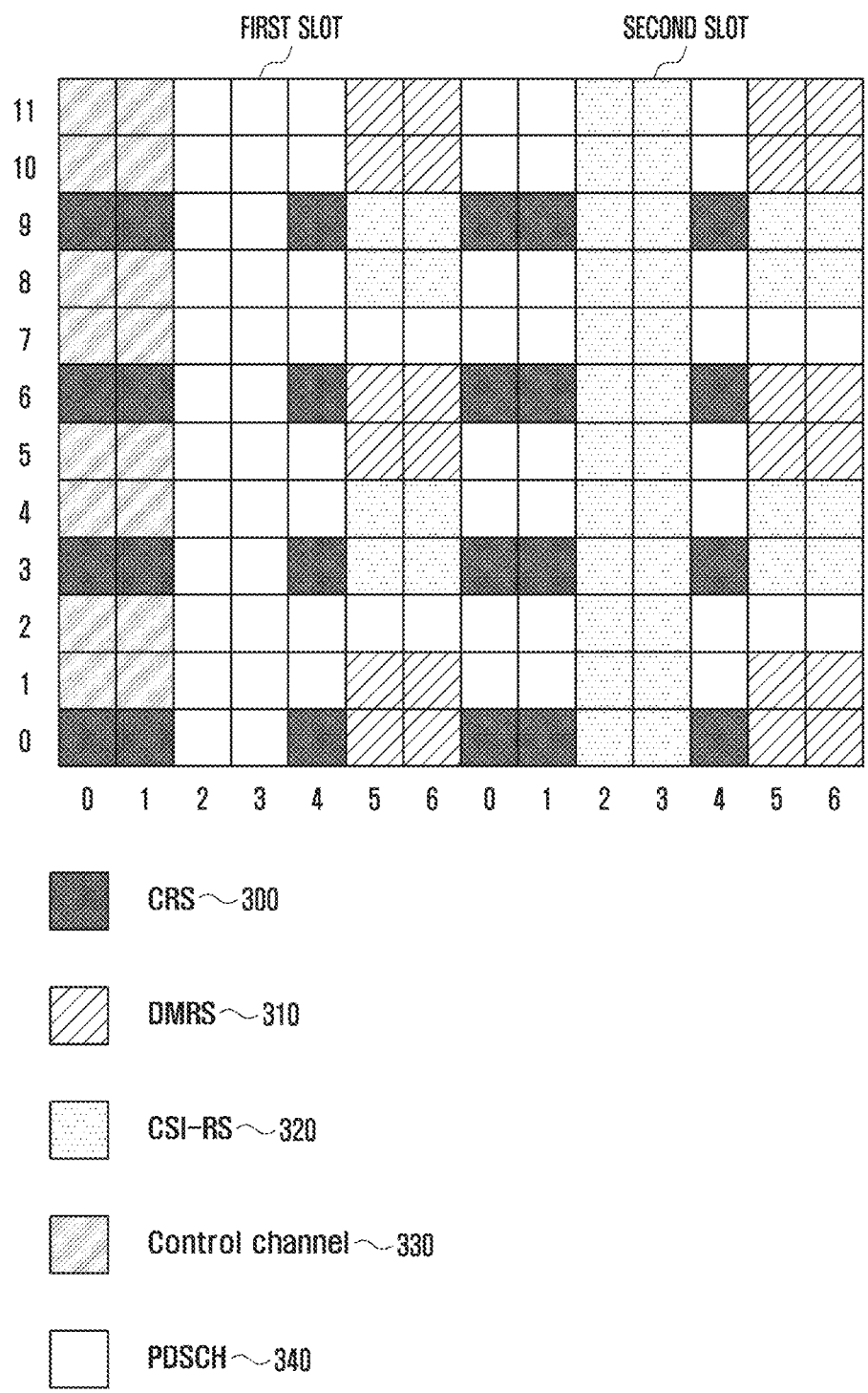
FIG. 3 is a diagram illustrating a wireless resource configuration of an LTE system.

FIG. 3 is a diagram illustrating downlink physical resources of an LTE system.

In an OFDM communication system, a downlink bandwidth is composed of a plurality of resource blocks (hereinafter, "RBs"), and each physical resource block (hereinafter, "PRB") may be composed of 12 subcarriers arranged along the frequency axis and 7 or 6 OFDM symbols arranged along the time axis as shown in FIG. 3. On the time axis, a subframe is composed of two slots, that is, a first slot and a second slot, each of which has a length of 0.5 ms as shown in FIG. 3. From the wireless resources as illustrated in FIG. 3, different kinds of signals may be transmitted as follows.

Cell specific RS (CRS) 300: This is a reference signal which is periodically transmitted for all terminals belonging to one cell. The CRS may be commonly used by a plurality of terminals.

Demodulation reference signal (DMRS) 310: This is a reference signal transmitted for a specific terminal. The DMRS is transmitted only in case where data is transmitted to the corresponding terminal. The DMRS may be composed of 8 DMRS ports in all. In the LTE/LTE-A, ports 7 to 14 correspond to DMRS ports, and the respective ports maintain orthogonality so that they do not generate interference with each other using CDM or OFDM.

Physical downlink shared channel (PDSCH) 340: This is a data channel for downlink data. The PDSCH is used for the base station to transmit traffic to the terminal, and is transmitted using an RE on which the reference signal is not transmitted in a data region that is a region excluding a control channel region of FIG. 3.

Channel status information reference signal (CSI-RS) 320: This is a reference signal transmitted for terminals belonging to one cell. The CSI-RS is used to measure the channel state. A plurality of CSI-RSs may be transmitted to one cell. In the LTE-A system, one CSI-RS may correspond to one, two, four, or eight antenna ports.

5. Other control channels (including PHICH, PCFICH, and PDCCH) 330: This is used to provide control information that is required for the terminal to receive the PDSCH or to transmit ACK/NACK for operating HARQ for uplink data transmission.

A physical dedicated control channel (PDCCH) region that is a control channel region and an enhanced PDCCH (ePDCCH) region that uses a data channel region are divided from each other on the time axis. This is to quickly receive and demodulate the control channel signal. In addition, the PDCCH region is located over the whole downlink band in a manner that one control channel is divided into control channels of a small unit, and the small-unit control channels are dispersedly located on the whole downlink band. An uplink is briefly divided into a control channel PUCCH and a data channel PUSCH. If the data channel does not exist, a response to the downlink data channel and other feedback information are transmitted through the control channel, whereas if the data channel exists, they are transmitted through the data channel. Hereinafter, the PDCCH transmission may mean transmission of the control signal on the PDCCH, and the PDSCH transmission or the PUSCH transmission may mean transmission of the signal on the PDSCH or the PUSCH.

In this case, at least one of the control signals, control channels, and data channels may be transmitted and received using parts of SC-FDMA or OFDM symbols in uplink or downlink subframes that are used to perform LTE communications. For example, transmission/reception of the control signals or channels or data channels may be performed using the subframes or k1 to 13 OFDM symbols (where, k1>0), which perform transmission of the control signals or channels or data channels using 0 to k1 OFDM symbols (where, k1<13) among 14 OFDM symbols (0 to 13 OFDM symbol indexes) that constitute 1 ms subframe. In this case, the subframes that transmit and receive the control signals or channels or data channels using partial symbols in the subframe as described above may be expressed as partial subframes.

Hereinafter, preferred embodiments of the present disclosure will be described in detail with reference to the accompanying drawings. In describing the present disclosure, related well-known functions or configurations incorporated herein are not described in detail in case where it is determined that they obscure the subject matter of the present disclosure in unnecessary detail. Further, terms to be described later are terms defined in consideration of their functions in the present disclosure, but may differ depending on intentions of a user and an operator or customs. Accordingly, they should be defined on the basis of the contents of the whole description of the present disclosure. Further, although a system that transmits and receives signals using at least one unlicensed band in a long term evolution (LTE) system, an LTE-Advanced (LTE-A) system, and an LTE-A-Pro system is exemplarily described in the description of the present disclosure, the present disclosure can be applied to other communication systems that simultaneously use a licensed band and an unlicensed band or a communication system that senses a frequency band for performing the signal transmission (or measures the strength of a received signal) before the signal transmission, and performs or does not perform the signal transmission in accordance with the result of the sensing without any particular addition and subtraction.

For convenience in explanation, in the present disclosure, explanation will be made on the assumption that a cell transmitting and receiving signals using an unlicensed band is configured and operated as an SCell. However, it is also possible to configure and operate a cell operating in an unlicensed band as a PCell or PSCell. Further, a base station or a cell performing communication using an unlicensed band may be expressed as an LAA SCell, an LAA Cell, an LAA base station, a base station, or a cell, and a terminal performing communication using an unlicensed band may be mixedly expressed as an LAA terminal, an LAA UE, or a terminal. However, in the embodiments of the present disclosure, the above-described expressions have the same meaning.

Further, for convenience in explanation, it is assumed that the present disclosure is applied to a carrier aggregation (CA) environment in which at least one licensed band cell and one or more unlicensed band cells are connected through an ideal backhaul. However, the present disclosure is not limited thereto, but may be applied even to a dual-connectivity environment in which the cells are connected through a non-ideal backhaul or a stand-alone environment in which only cells that operate only in an unlicensed band are connected to each other without any licensed band cell. Further, in the present disclosure, explanation will be made on the assumption that an LAA terminal transmits an uplink control signal or channel or uplink data to an LAA cell using an unlicensed band. However, the present disclosure can also be applied to a case where an LAA cell transmits a downlink control signal or channel or downlink data to an LAA terminal using an unlicensed band.

Generally, in the unlicensed band, a plurality of devices share and use the same frequency band or channel. In this case, the devices that use the unlicensed band may use different systems. Accordingly, for mutual coexistence between various devices, the devices that operate in the unlicensed band may perform channel sensing with respect to the unlicensed band before performing communication using the unlicensed band or channel, and may perform or may not perform communication with respect to the unlicensed band in accordance with the result of the channel sensing. In this case, if the unlicensed band can be used in accordance with the result of the channel sensing, the device can continuously occupy and use the unlicensed band for a maximum channel occupancy time (MCOT) that is predefined or preconfigured.

General operations of the devices that operate in the unlicensed band are as follows. A transmission device that requires signal transmission including data or a control signal may confirm whether other devices occupy (or use) the unlicensed band or channel in which the signal transmission is performed before performing the signal transmission, and may occupy or may not occupy the channel in accordance with the confirmed channel occupation state of other devices. Such an operation is generally called listen-before-talk (LBT) (or channel sensing operation or channel sensing). In other words, at least the transmission device among the devices that intend to perform communication using the unlicensed band should determine whether to occupy the channel in accordance with the predefined or preconfigured method.

In this case, in order to determine whether to occupy the unlicensed band or channel, time that is required to sense the channel may be predefined, may be configured from the transmission device or a specific device, or may be selected as an arbitrary value in a specific range. Further, the channel sensing time may be configured in proportion to the maximum channel occupation time in which the unlicensed band can be continuously occupied at maximum without any separate channel sensing operation. Further, the channel sensing time for performing the channel sensing operation may be configured in accordance with the maximum channel occupation time. In this case, at least one configuration value of the channel sensing operation may be differently configured in accordance with the unlicensed band for performing the operation or in accordance with regional or national regulations. For example, in case of the United States, the unlicensed band can be currently used without separate channel sensing operation except for a radar sensing operation in 5 GHz frequency band.

The transmission device that intends to use the unlicensed band may sense whether other devices use the corresponding channel through the above-described channel sensing operation (or LBT), and if it is sensed that other devices do not occupy the corresponding channel, the transmission device may occupy and use the channel. In this case, the devices using the unlicensed band may operate to predefine or configure the maximum channel occupation time for the continuous occupation after the channel sensing operation. The maximum occupation time may be predefined in accordance with regulations that are defined according to the frequency band, regional and/or national regulations, or may be separately configured from another device (e.g., in case of the terminal, the base station). For example, in case of Japan, the maximum occupation time in 5 GHz unlicensed band is restricted to 4 ms.

A channel occupation method in an LAA cell in order for an LAA system to use an unlicensed band is as follows. If the intensity of a signal that is received during the whole or a part of a fixed channel sensing period is higher than a predefined threshold value in case where a channel sensing operation is performed with respect to the corresponding unlicensed band for the fixed period (e.g., 25 μs) in the LAA cell, the LAA cell determines that at least one of other devices uses the unlicensed band, and does not perform communication using the unlicensed band. If the intensity of the signal that is received during the whole of the fixed channel sensing period is lower than the predefined threshold value, the LAA cell determines that the unlicensed band is in an idle state, and thus can continuously use the unlicensed band for the maximum channel occupation period that is predefined or preconfigured.

If the intensity of the signal that is received during a part of a variable channel sensing period is higher than the predefined threshold value in case where the channel sensing operation is performed with respect to the corresponding unlicensed band for the configured variable period in the LAA cell, the LAA cell determines that at least one of other devices uses the unlicensed band, and does not perform communication using the unlicensed band. If the intensity of the signal that is received during the whole of the variable channel sensing period is lower than the predefined threshold value, the LAA cell determines that the unlicensed band is in an idle state, and thus can continuously use the unlicensed band for the maximum channel occupation period that is predefined or preconfigured.

In this case, the variable channel sensing period may be varied through selection of an arbitrary value in a contention window that is configured or managed by the LAA cell. For example, the LAA cell may select an arbitrary variable N (e.g., in case where a maximum value of an initial contention window is 15, the LAA cell may select an arbitrary integer N) from a channel contention window set that is selected on the basis of at least one of the kind of the signal to be transmitted by the LAA cell and the maximum channel occupation period to be maximally occupied by the LAA cell, may perform the channel sensing operation as long as the selected N period, and then may occupy and use the unlicensed band. In this case, the probability that other devices can simultaneously use the unlicensed band can be lowered by changing or initializing the contention window on the basis of the result of reception of the terminal (e.g., ACK/NACK that is transmitted by the terminal) with respect to the data signal that is transmitted through the unlicensed band. For example, if NACK generation exceeds 80% of the reception results of all terminals with respect to data signals that are transmitted from the very first subframe in the maximum channel occupation period through the unlicensed band, the LAA cell increases the contention window. If the NACK generation does not exceed 80% of the reception results of all terminals with respect to the data signals that are transmitted from the very first subframe in the maximum channel occupation period through the unlicensed band, the LAA cell configures the contention window as an initial value.

Figure 4:
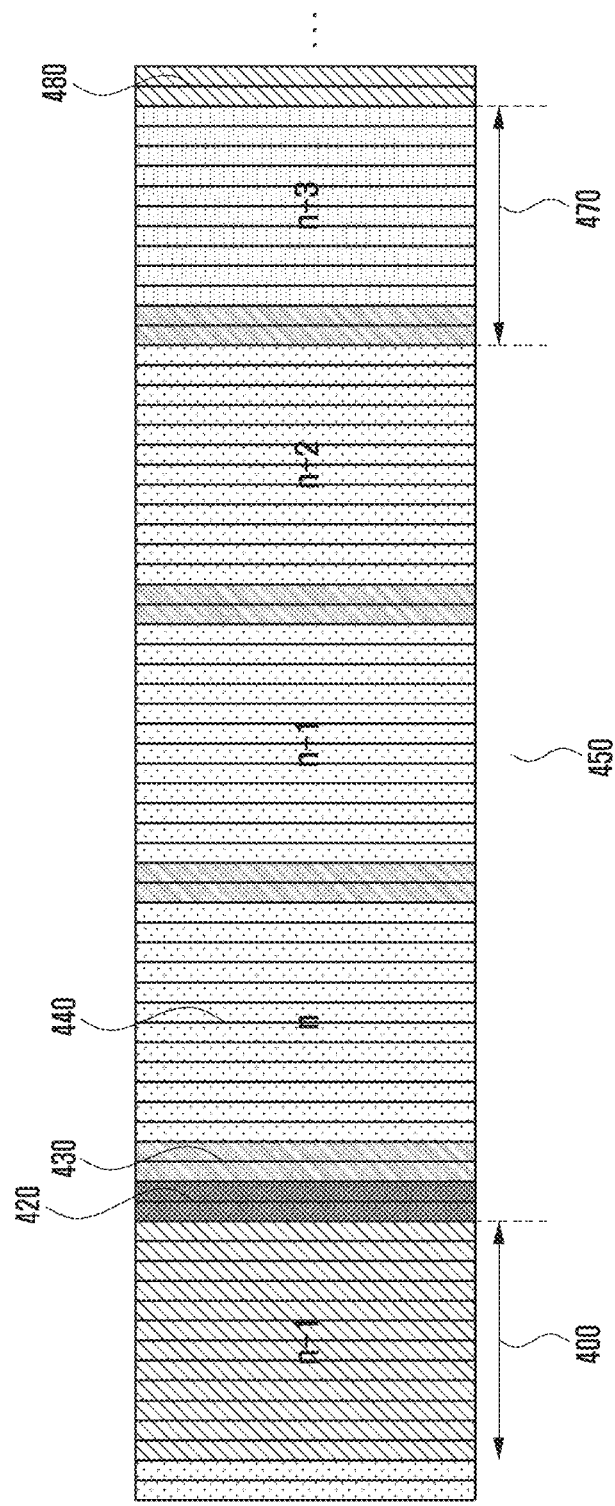
FIG. 4 is a diagram illustrating a downlink channel connection type in an unlicensed band of an LAA system.

FIG. 4 is a diagram illustrating an LAA downlink transmission operation.

A general LAA downlink transmission operation will now be described with reference to FIG. 4. An LAA cell that transmits a downlink signal using an unlicensed band performs channel sensing operation with respect to the unlicensed band for a time 400 that corresponds to a variable period that is arbitrarily selected in a configured contention window. If it is determined that the unlicensed band is in an idle state through the channel sensing operation, the LAA cell can occupy the unlicensed band for the maximum channel occupation period 450. In this case, if the channel sensing operation is ended before a subframe boundary or a slot boundary, the LAA cell may occupy the unlicensed band through transmission of a predefined signal 420 up to the subframe or slot boundary, and may transmit general LTE signals (e.g., a control signal 430 on PDCCH, a data signal 440 on PDSCH, and a reference signal) in a slot or subframe. In this case, the last subframe in the maximum channel occupation period may be a partial subframe 470 in accordance with an occupation start time of the unlicensed band and the maximum channel occupation period.

Figure 5:
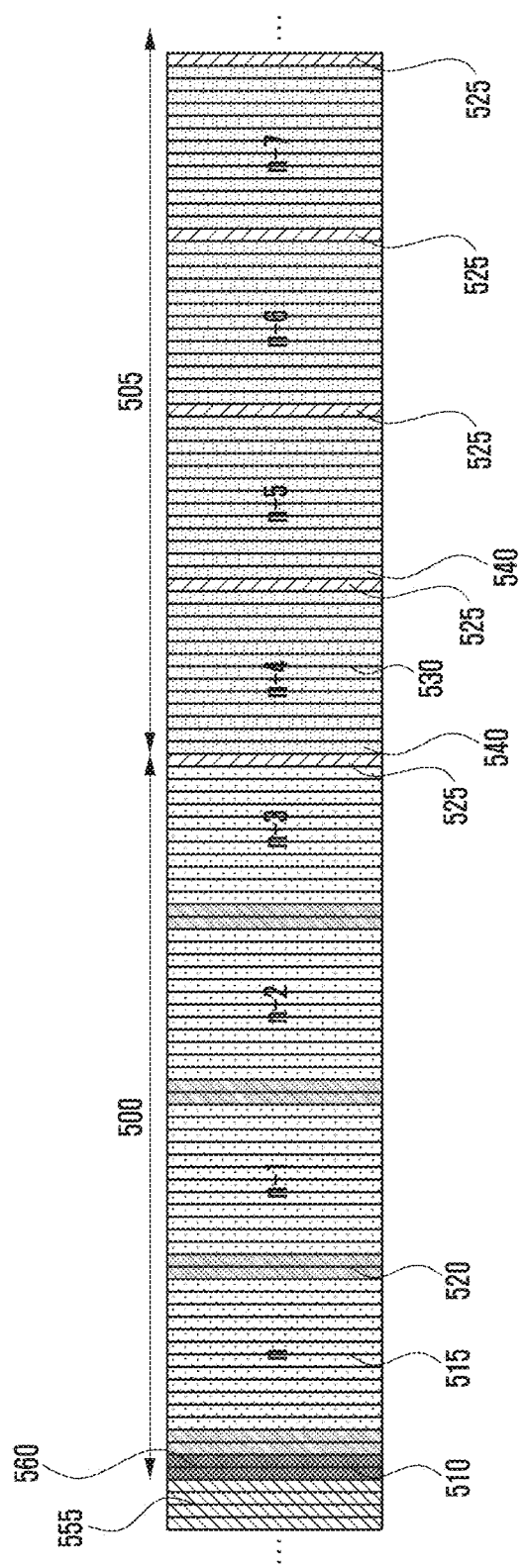
FIG. 5 is a diagram illustrating an uplink channel connection type in an unlicensed band of an LAA system.

FIG. 5 is a diagram illustrating a general LAA uplink transmission operation.

A general LAA uplink transmission operation will now be described with reference to FIG. 5. An LAA terminal that transmits an uplink signal using an unlicensed band may receive uplink transmission configuration through control information that is transmitted onto a downlink control channel 510 in subframe n in a downlink transmission period 500 of an LAA cell, and may perform uplink transmission 530 in subframe n+4 in which the uplink transmission has been configured through the uplink transmission configuration. In this case, if the uplink transmission of the LAA terminal is uplink transmission in the unlicensed band, the LAA terminal should perform channel sensing operation before performing the configured uplink transmission 530. In this case, the channel sensing operation that is performed by the LAA terminal may be equal to the channel sensing operation that is performed by the LAA cell, or partial variables (e.g., contention window sizes) may differ from each other. Further, the channel sensing operation 525 of the LAA terminal may be performed in at least one SC-FDMA symbol 540 in the same subframe in which the uplink transmission has been configured, or may be performed in at least one SC-FDMA symbol 525 just before the configured uplink subframe. In this case, the LAA terminal may perform or may not perform the configured uplink transmission in accordance with the result of the channel sensing operation.

Further, the terminal may transmit an uplink control signal (e.g., sounding reference signal (hereinafter, SRS)) using one symbol in the uplink subframe periodically or non-periodically in accordance with the configuration of the base station or the cell. The base station or the cell may configure the SRS transmission to the terminal through downlink signal reception configuration or uplink signal transmission configuration on the downlink control channel PDCCH. In this case, the base station or the cell may perform measurement of uplink and downlink channels of the terminal using the configured SRS.

As described above, if the SRS transmission in the configured uplink subframe is configured in the terminal in which transmission of at least one of the uplink data and the control information is configured using the unlicensed band, the method for transmitting the configured uplink signal may be changed in accordance with the configured uplink signal type, the number of empty symbols configured for the channel sensing operation and locations of the empty symbols, and whether to configure the SRS transmission. Accordingly, the present disclosure proposes a method for transmitting the uplink data and the control information of the terminal more efficiently by determining the method for transmitting the uplink data and the control information of the terminal in accordance with at least one of whether to transmit the uplink data channel and whether the uplink control signal can be transmitted, the number of empty symbols configured for the channel sensing operation, and whether to configure the SRS transmission.

In an LTE system, a terminal may perform uplink data transmission in accordance with base station configuration or instructions. Signal transmission on an uplink data channel (hereinafter, physical uplink shared channel (PUSCH)) of the terminal is instructed by a base station through control information on a downlink control channel (hereinafter, physical downlink control channel (PDCCH)), and the terminal transmits the configured uplink signal using the time relationship between an uplink transmission configuration reception time (e.g., PDCCH reception time) that is predefined with the base station and a configured uplink signal transmission time (e.g., PUSCH transmission time). For example, in case of an FDD system, if the base station instructs the terminal to perform PUSCH transmission through the PDCCH in subframe n, the terminal performs the PUSCH transmission using resources that are configured from the base station in subframe n+K. In this case, K may be configured as a different value including 4. In case of a TDD system, the terminal may perform PUSCH transmission using the relationship between a PDCCH reception time and a PUSCH transmission time predefined between the base station and the terminal, which includes uplink transmission configuration information. At this time, in case of a system having a third frame structure except for the FDD and TDD, the time relationship defined in the FDD or TDD system may be reused as the time relationship between the uplink transmission configuration information reception time and the configured uplink signal transmission time, or a new time relationship between the uplink transmission configuration reception time and the configured uplink signal transmission time may be defined for the system having the third frame structure.

In the LTE system, the terminal may transmit uplink control information (hereinafter, "UCI") to the base station using at least one of a physical uplink control channel (PUCCH) and PUSCH that are determined by at least one standard including the UCI kind and base station/terminal configuration in accordance with the base station configuration or instructions. Here, the UCI information may be composed of one or more of HARQ-ACK, periodic channel state information (CSI), non-periodic CSI, and scheduling request information (hereinafter, mixedly used with SR). For example, the terminal may periodically report channel state information to the base station through the PUCCH in accordance with a period that the base station has configured as an upper signal. If the base station instructs the terminal to non-periodically report the CSI through the PDCCH, the terminal may report the measured CSI to the base station through the PUSCH configured by the PDCCH.

The base station and the terminal that are described in the present disclosure relate to a base station and a terminal that can transmit/receive signals through one or more cells that operate in a licensed band or an unlicensed band, and may also include a base station and a terminal that can transmit and receive signals through one or more cells of the licensed band, and a base station that can transmit signals through one or more cells of the unlicensed band and a terminal that can receive a signal from one or more cells of the unlicensed band. Unless separately explained, it is assumed that the terminal and the base station that are described in the present disclosure are configured to transmit and receive signals through one or more cells. In this case, explanation will be made on the assumption that the configured cells are composed of cells operating in at least one licensed band and cells operating in at least one unlicensed band. In this case, the present disclosure can be applied even to a base station and a terminal operating only in the unlicensed band without any separate licensed band.

Further, it is assumed that the cell that operates in the licensed band, or the base station and the terminal, which are described in the present disclosure, are configured and operate in at least one duplex type of FDD (or frame structure type 1) and TDD (or frame structure type 2). Further, it is assumed that the cell that operates in the licensed band, or the base station and the terminal, which are described in the present disclosure, are configured and operate in the third frame structure (or frame structure type 3). Here, the frame structure type 3 includes a frame structure requiring the channel sensing operation, and is structured so that all subframes can be configured as a downlink or an uplink. Accordingly, the downlink and uplink periods can be freely changed within a range that is permitted by the technology or regulations in accordance with the base station configuration.

Further, the method that is proposed in the present disclosure is not limited to respective embodiments, but can be applied to all embodiments or invention described in the present disclosure.

Further, the present disclosure relates to a terminal configured to transmit a PUCCH through one PUCCH group or one cell, and it is assumed that the PUCCH corresponds to a cell operating in the licensed band. However, the present disclosure can also be applied to a terminal configured to transmit the PUCCH through a cell (PCell, PSCell, or SCell) operating in the unlicensed band. Further, in the present disclosure, although explanation will be made on the assumption that the cells operating in the unlicensed band are operated using different channels in the unlicensed band, it is also possible to apply the present disclosure even to a case where different cells are operated using the same unlicensed band channel.

The terminal may perform a channel sensing operation in an unlicensed band or an LAA cell in which the corresponding uplink transmission is configured before the uplink transmission configured by the base station is performed, and may or may not perform the configured uplink transmission in accordance with the result of the performed channel sensing operation. In this case, the base station may configure the terminal to perform a channel sensing operation method before the configured uplink transmission is performed. In this case, in order to correctly perform the channel sensing operation for uplink transmission of the terminal, the base station may not transmit a downlink control signal or a data signal in a period in which the corresponding channel sensing operation is performed.

In order to secure the channel sensing period, the base station may configure to the terminal the number of symbols on which actual uplink information is transmitted in subframe n in which the uplink transmission is configured. For example, the base station may configure the terminal to perform the uplink transmission using all the first symbol to the last symbol in uplink transmission subframe n, to perform the uplink transmission using the second symbol to the last symbol in the uplink transmission subframe n, to perform the uplink transmission using the first symbol to the symbol before the last symbol in the uplink transmission subframe n, or to perform the uplink transmission using the second symbol to the symbol before the last symbol in the uplink transmission subframe n. The configuration information may be included in uplink transmission configuration control information that the base station transmits to the terminal through a downlink control channel or scheduling information (UL grant).

Further, the base station may configure the actual uplink transmission start time in the subframe n in which the uplink transmission is configured through the configuration information included in the uplink transmission configuration control information that the base station transmits to the terminal through the downlink control channel or the scheduling information (UL grant). The base station may configure the terminal to perform the uplink signal transmission configured from the first symbol start boundary in the uplink transmission subframe n, to perform the uplink signal transmission configured from the second symbol start boundary in the uplink transmission subframe n, to perform the uplink signal transmission configured from the first symbol start boundary after a predetermined time x (e.g., x is 25 microseconds) in the uplink transmission subframe n, or to perform the uplink signal transmission configured after a predetermined time x and timing advanced time (TA) configured from the base station and estimated by the terminal, that is, x+TA time, on the first symbol start boundary in the uplink transmission subframe n. The base station may configure the actual uplink transmission start time in the subframe n in which the uplink transmission is configured by selecting one of time points configurable as the uplink transmission start time and including the configuration information in the uplink transmission configuration control information that the base station transmits to the terminal through the downlink control channel or the scheduling information (UL grant) to be transmitted.

Accordingly, if the uplink configuration information received from the base station is configured so that the terminal, which is configured to be able to configure the uplink transmission in a plurality of uplink subframes with one piece of uplink configuration information, performs the uplink transmission in the plurality of uplink subframes, the terminal having received this may configure the location and the number of symbols on which the above-described uplink transmission is performed with respect to the plurality of uplink subframes (or uplink transmission performance start symbol location and end start location in an uplink subframe), and an uplink transmission start time. Further, such information may be preconfigured or predefined through transmission thereof from the base station using the downlink control channel or an upper signal.

For example, the terminal may perform the uplink transmission by applying the location of the symbol on which the uplink transmission included in the uplink transmission configuration control information is performed to the start subframe and the last subframe among the plurality of subframes in which the uplink transmission is configured. In other words, the terminal is configured by the base station to perform the uplink transmission in the plurality of uplink subframes through the uplink transmission configuration control information, and the control information configures the terminal to perform the uplink transmission using the second symbol to the symbol before the last symbol. In this case, in the first subframe among the plurality of uplink transmission subframes, the terminal may perform the uplink transmission using the second symbol to the last symbol, and in the last subframe among the plurality of uplink transmission subframes, the terminal may perform the configured uplink transmission using the first symbol to the symbol before the last symbol. In the remaining subframes, the terminal may perform the uplink transmission using the first symbol to the last symbol.

In this case, in case of the first subframe, it may be determined that the terminal performs the uplink transmission using the remaining symbols except for one symbol. Accordingly, the terminal can encode the uplink data transmitted from the subframe before the start of the first subframe based on the number of symbols effective to the uplink transmission. In other words, the terminal can perform rate matching with respect to the symbol (e.g., first symbol) on which the uplink signal is not transmitted in the subframe.

However, if the terminal determines that the channel has been occupied by other devices through the channel sensing operation performed before the transmission of the first subframe, the terminal is unable to perform the uplink transmission in the first subframe in which the uplink transmission is configured. In this case, if the terminal continuously performs the channel sensing operation with respect to the channel and determines that the channel is in an idle state before the second subframe, the terminal can perform the uplink transmission in the second subframe in which the uplink transmission is configured. If the uplink transmission start symbol and the uplink transmission end symbol in the second subframe are respectively different from the uplink transmission start symbol and the uplink transmission end symbol in the first subframe, the terminal should again perform the encoding of the uplink data intended to be transmitted in the first subframe or new data in accordance with the number of uplink transmission symbols configured in the subframe in which the uplink transmission is possible, for example, in the second subframe.

In order to solve the above-described problem, the terminal may first encode the uplink data transmission channel based on a specific symbol. For example, in case of an LTE system using a normal CP, the terminal generates the uplink data channel for transmitting the uplink data signal based on 14 symbols. If the number of symbols on which the uplink transmission is effective in the subframe used for the corresponding data channel transmission is smaller than 14, the terminal can match the generated data signal to the symbols effective to the uplink transmission of the corresponding subframe in a puncturing method from the last symbol of the data channel generated based on the 14 symbols. In the above-described example, in case of the first subframe among the plurality of subframes in which the uplink transmission is configured, there are 13 effective symbols, and thus the terminal can transmit the data signal after puncturing a part of the data signal generated based on the 14 symbols in the first subframe, which corresponds to the last symbol of the uplink channel. As described above, since there are 14 symbols effective to the uplink transmission in the second subframe, the terminal can perform the uplink transmission without any separate puncturing. If there are 12 effective symbols in the uplink subframe (e.g., in case where the uplink transmission start time is configured as the second symbol and the end symbol is configured as the symbol before the last symbol), the terminal may puncture two last symbols of the uplink data channel generated based on the 14 symbols, and may perform signal transmission in the corresponding uplink subframe.

If UCI information (e.g., at least one of periodic CSI, aperiodic CSI, HARQ-ACK, and scheduling request information) is transmitted in subframe n+K through the terminal in which the uplink PUSCH transmission is configured from the base station in subframe n+K through the downlink control channel of subframe n, the terminal may include a part of the UCI information in the configured PUSCH transmission to be transmitted to the base station. In this case, a method for transmitting the PUSCH transmission including the UCI information is simply illustrated in FIG. 6.

Figure 6:
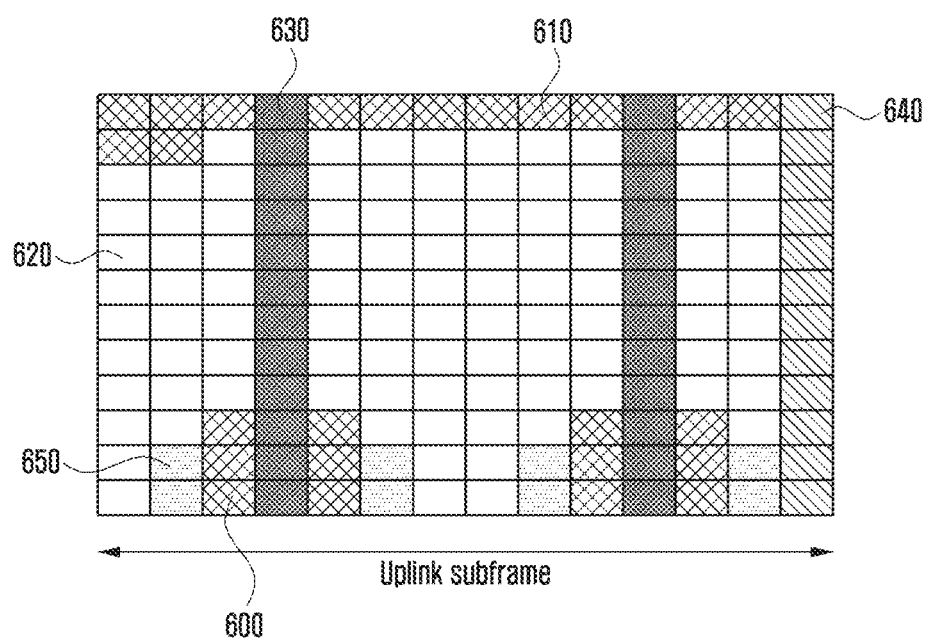
FIG. 6 is a diagram illustrating the structure of a subframe in case of transmitting UCI information to a PUSCH.

FIG. 6 is a diagram illustrating a method for transmitting an uplink data channel including UCI information.

Referring to FIG. 6, in one uplink subframe composed of two slots, uplink DM-RS 630 is transmitted from SC-FDMA symbol indexes 3 and 10. If UCI information is included in the configured PUSCH transmission to be transmitted, HARQ-ACK information 600 is included just on both sides of the symbol of the DM-RS 630 to be transmitted, and rand indicator (RI) information 650 of the CSI information is included on both sides of the symbol of the included HARQ-ACK information 600 to be transmitted. In this case, channel quality indicator (CQI) and precoding matrix indicator (PMI) information 610 of the CSI information excluding the RI information 650 may be included in the subcarrier having the highest frequency resource index among the configured PUSCH transmission resource region to be transmitted. As described above, the UCI information may be included (embedded or multiplexed) in the uplink data to be transmitted.

Figure 7:
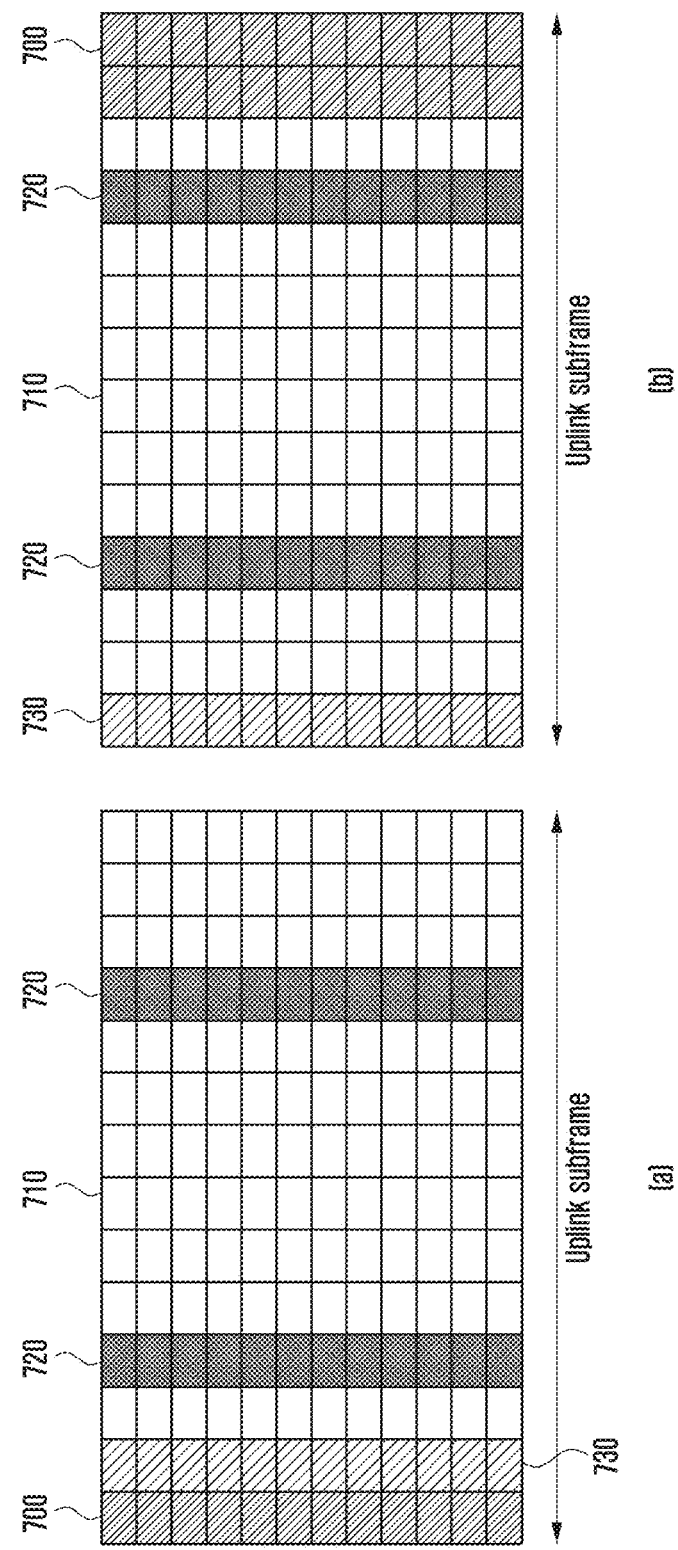
FIGS. 7A and 7B are diagrams illustrating the structure of a subframe in case of transmitting a channel sensing operation and an SRS to a PUSCH.

FIGS. 7A and 7B are diagrams illustrating a case where symbols on which UCI and SRS are transmitted overlap a channel sensing period according to the present disclosure.

Referring to FIGS. 7A and 7B, if PUSCH transmission in an unlicensed band of a terminal is configured by a base station, and SRS transmission is configured in the configured PUSCH transmission subframe, or if PUSCH transmission in an unlicensed band of a terminal is configured by a base station, SRS transmission is configured in the configured PUSCH transmission subframe, at least one uplink transmission symbol in the configured uplink transmission subframe is emptied for the channel sensing operation or is configured not to be used for the PUSCH transmission, and UCI information is additionally included on the PUSCH to be transmitted as described above, a part of the uplink symbols illustrated in FIG. 6 may not be used for the UCI transmission or SRS transmission.

For example, as shown in FIG. 7A, it is assumed that in a subframe in which uplink PUSCH transmission is configured, the first symbol 700 is configured not to be used for the PUSCH transmission for the channel sensing operation, and the second symbol 730 of the configured PUSCH transmission subframe is configured to transmit the SRS. If the UCI transmission and the SRS transmission are configured on the configured PUSCH, the terminal may transmit only one of RI information 650 (in FIG. 6) transmitted on the second symbol of the uplink subframe in the related art and the configured SRS, or may transmit the UCI and/or SRS through new definition of a UCI including method on the configured PUSCH. Further, in case of performing the channel sensing operation configured on the first symbol of the uplink subframe, the CSI (CQI/PMI) information 610 (in FIG. 6) on the symbol may not be transmitted. Accordingly, in case where the terminal requires the UCI transmission in the PUSCH transmission subframe configured by the base station, the terminal operation should be defined in case where at least one symbol on which at least one of the channel sensing operation and the SRS transmission operation is performed overlaps symbols on which the UCI information is transmitted.

If the terminal is configured to perform at least one of the channel sensing operation and the SRS transmission operation in the PUSCH transmission subframe configured by the base station, the number of SC-FDMA symbols that are effective or are used for the PUSCH transmission in the PUSCH transmission subframe (hereinafter, the number of symbols) may be determined as follows. The terminal determines the remaining symbols excluding the symbol used or configured for the channel sensing operation in the subframe in which the uplink transmission is configured as symbols effective to the PUSCH transmission in the subframe. If the SRS transmission is configured in the uplink transmission subframe, or if SRS transmission of another user is configured, the remaining symbols additionally excluding the symbol for the SRS transmission are determined as symbols effective to the PUSCH transmission in the subframe. This is expressed in the following mathematical expression.

$$N_{symb}^{PUSCH\text{-}initial(x)} = (2 \cdot (N_{symb}^{UL} - 1) - N_{SRS}^{(x)} - N_{symb}^{channel\text{-}access(x)}), x = \{1, 2\}$$ [Mathematical expression 1]

Here, $N_{symb}^{PUSCH\text{-}initial(x)}$ is the number of symbols used to transmit first and second transmission blocks in initial PUSCH transmission. $N_{symb}^{UL}$ is the number of symbols included in an uplink slot, and in general, is 7. $N_{SRS}^{(x)}$ is the number of symbols used for the SRS transmission in the uplink subframe for initial transmission of the first and second transmission blocks, and may have a value of 0 or 1. $N_{symb}^{channel\text{-}access(x)}$ is the number of symbols configured to be emptied for the channel sensing operation in the uplink subframe for the initial transmission of the first and second transmission blocks, and may be configured as one value of K (K=0, 1, 2, . . . 14). Further, $N_{symb}^{channel\text{-}access(x)}$ may indicate the number of transmission blocks or the number of symbols configured to be emptied for the channel sensing operation in the uplink subframe regardless of initial transmission or not. In this case, the number of symbols for the channel sensing operation may be predefined between the terminal and the base station, may be included in an upper signal to be configured to the terminal during uplink connection configuration for LAA SCell of the base station, or may be included in the uplink transmission configuration information to be configured by the base station. The number of symbols used for the channel sensing operation may be differently configured for subframes.

The terminal determines that the configured PUSCH transmission is effective with respect to the remaining symbols excluding the symbol configured through the channel sensing operation and the SRS transmission operation in one uplink subframe configured by the base station, and perform PUSCH transmission using the effective symbols. Accordingly, CQI/PMI information of UCI information intended to be transmitted in the uplink subframe in which the PUSCH transmission is configured is transmitted using symbols effective to UCI information transfer among the remaining symbols excluding the symbol configured through the channel sensing operation and the SRS transmission operation (e.g., excluding DMRS symbol).

If UCI transmission in the PUSCH transmission subframe configured from the base station is necessary, the terminal may be configured to perform at least one of the channel sensing operation and the SRS transmission operation in the configured PUSCH transmission subframe, and if the symbol on which at least one of the configured channel sensing operation and the SRS transmission operation is performed is equal to at least one of symbols on which the UCI information is transmitted, the terminal may perform one or more of the channel sensing operation, the SRS transmission operation, and the UCI transmission in accordance with at least one of the following methods.

In method 1, if the UCI transmission in the PUSCH transmission subframe configured from the base station is necessary, the terminal is configured to perform at least one of the channel sensing operation and the SRS transmission operation in the configured PUSCH transmission subframe, and if the symbol on which at least one of the configured channel sensing operation and the SRS transmission operation is performed is equal to at least one of symbols on which at least one piece of UCI information (e.g., RI or HARQ-ACK) is transmitted, the terminal transmits the UCI in accordance with a new UCI including method.

In method 2, if the UCI transmission in the PUSCH transmission subframe configured from the base station is necessary, the terminal is configured to perform at least one of the channel sensing operation and the SRS transmission operation in the configured PUSCH transmission subframe, and if the symbol on which the configured SRS transmission operation is performed is equal to at least one of symbols on which at least one piece of UCI information (e.g., RI or HARQ-ACK) is transmitted, the terminal transmits the UCI information without transmitting the SRS on the symbol.

In method 3, if the UCI transmission in the PUSCH transmission subframe configured from the base station is necessary, the terminal is configured to perform at least one of the channel sensing operation and the SRS transmission operation in the configured PUSCH transmission subframe, and if the symbol on which the configured channel sensing operation is performed is equal to at least one of symbols on which at least one piece of UCI information is transmitted, the terminal performs the channel sensing operation without transmitting the UCI on the symbol.

Method 1 will be described in more detail as follows.

If the UCI transmission in the PUSCH transmission subframe configured from the base station is necessary, the terminal is configured to perform at least one of the channel sensing operation and the SRS transmission operation in the PUSCH transmission subframe, and a case where the symbol on which at least one of the configured channel sensing operation and the SRS transmission operation is performed is equal to at least one of the symbols on which at least one piece of UCI information is transmitted will be described. In this case, the terminal may include the UCI information in the symbol that is determined as an effective symbol during the above-described PUSCH transmission to be transmitted.

As illustrated in FIG. 7A, a case where the terminal, which requires the UCI transmission including at least RI in the PUSCH transmission subframe configured from the base station, is configured to perform the channel sensing operation on the first symbol and to perform the SRS transmission operation on the second symbol in the configured PUSCH transmission subframe will be described. In other words, as illustrated in FIGS. 7A and 7B, if the SRS transmission and the RI transmission are performed on the same symbol, the terminal may include the UCI information in the symbol determined as an effective symbol in the configured PUSCH transmission to be transmitted. In other words, in case where one symbol in the RI transmission region (four symbols) is to be used for the SRS transmission, the terminal may use the symbol for the SRS transmission, and may transmit the RI information intended to be transmitted using the three remaining symbols.

This will be described in more detail as follows on the assumption that the SRS transmission is performed on the second symbol that is one of symbols on which the RI is transmitted. In this case, even in case where one symbol of the RI transmission region is used for the channel sensing operation, a new UCI transmission type described in the present disclosure can be applied in the same manner. If the terminal, which is configured to transmit the UCI information including the RI information in the uplink subframe in which the PUSCH transmission is configured, is configured to transmit the SRS on one symbol of the RI transmission region, the terminal may transfer the RI information using the symbols excluding the symbol on which the SRS (or channel sensing operation) is performed among symbol indexes for transmitting the RI information, column set {1, 4, 7, 10} (in case of a normal cyclic prefix), or column set {0, 3, 5, 8} (in case of an extended cyclic prefix). The column set is a set of symbols on which a specific UCI is transmitted among symbols used to transmit the data excluding the DMRS in the uplink subframe, and for understanding, the latest version of 3GPP TS 36.212 may be referred to. For example, if it is configured to perform the SRS transmission on the second symbol (or symbol index 1) as described above, the terminal may transmit the RI using the symbols excluding the symbol on which the SRS or channel sensing operation is performed among symbol indexes for transmitting the RI information, new column set {4, 7, 10} (in case of a normal cyclic prefix), or new column set {3, 5, 8} (in case of an extended cyclic prefix, it may be assumed that the channel sensing operation is performed on the first symbol (or symbol index 0), and the SRS is transmitted on the second symbol (or symbol index 1)).

In this case, the terminal transfers the RI information in the following method from the subcarrier having the lowest frequency index among the configured PUSCH resource regions. That is, the terminal may generate matrices $g_0$, $g_1$, ... $g_{H'-1}$ by multiplexing G encoded bit signals $f_0$, $f_1$ ... $f_{G-1}$ intended to be transmitted through the uplink PUSCH transmission (or UL-SCH transmission) and $N_L Q_{CQI}$ bit signals $q_0$, $q_1$, ... q $N_L \cdot Q_{CQI}$-1 in which UCI information (CQI/PMI) is encoded. In this case, H is H=(G+$N_L \cdot Q_{CQI}$), H' is H/($N_L \cdot Q_m$), and g is a column vector having a size of ($N_L \cdot Q_m$). Here, $Q_m$ is a modulation order. After passing through a channel interleaver receiving an input of $g_i$ vector columns intended to be transmitted and $q_0^{RI}, q_1^{RI}, \ldots, q_{Q'_{RI}}^{RI}-1, q_0^{ACK}, q_1^{ACK}, \ldots, q_{Q'_{ACK}}^{ACK}-1$ bits or vectors, the number of modulation symbols transmitted to one layer in one subframe is $H'_{total} = H'Q'_{RI}$. As the above-described example, if it is assumed that the number of effective symbols $N_{symb}^{PUSCH}$ in the uplink transmission subframe is $C_{max}$, a matrix composed of $R_{max}=(H'_{total} \cdot Q_m \cdot N_L)/C_{max}$ rows and $C_{max}$ columns as a signal bit stream to be transmitted in the subframe, and in this case, they can be expressed as $R'_{max}=R_{max}/(Q_m \cdot N_L)$.

Thereafter, a method for mapping the RI information to a symbol determined as an effective symbol is as follows. First, i and j are set to i, j=0, and r is set to $R'_{max}-1$. Thereafter, until i becomes larger than $Q'_{RI}$, the RI value is mapped to the following time and frequency resources to be transmitted. This is performed in accordance with mathematical expression 2 as below.

[Mathematical expression 2]

Set i, j to 0
Set r to $R'_{max}-1$
While i<$Q'_{RI}$
  $C_{RI}$=new column set(j)
  $y_{rxC\_max}+c_{RI} = q^{RI}\_i$
  i=i+1
  r=$R'_{max}$-1- floor(i/4)
  j=(j+3)mod4
end while That is, if the terminal, which requires the UCI transmission including at least the RI in the PUSCH transmission subframe configured from the base station, is configured to perform the channel sensing operation on the first symbol and to perform the SRS transmission operation on the second symbol in the PUSCH transmission subframe, in other words, as illustrated in FIGS. 7A and 7B, if the SRS transmission and the RI transmission are performed on the same symbol (second symbol), the RI information of the UCI information can be transmitted on symbols (symbol indexes 4, 7, and 10) effective to the RI transmission among symbols determined as effective symbols in the configured PUSCH transmission. In this case, mapping of the RI information is performed in a manner that the RI is mapped in the order of symbol indexes 4, 10, and 7 in the subcarrier having the lowest subcarrier index among the resource regions in which the uplink transmission is configured, the subcarrier index is increased by 1, and then the RI is mapped again in the order of the symbol indexes 4, 10, and 7 in the increased subcarrier. In this case, "0" may be added during RI bit encoding so that the RI information is uniformly included in the number of symbols (e.g., three symbols) on which the RI symbol transmission is effective.

Further, although the above-described example has been described on the assumption that the SRS transmission and the UCI (or RI) information transmission is performed on symbol index 1, the new UCI mapping method can be applied in the same manner even in case where the SRS transmission or the channel sensing operation and the UCI information transmission are performed on symbol index 10, or the HARQ-ACK transmission and the SRS or the channel sensing operation are simultaneously performed on symbol index 2 or 9. For example, in case where the SRS transmission or the channel sensing operation and the UCI information transmission are performed on symbol index 10, a new column set at a normal CP may be configured as {1, 4, 7}. Further, in accordance with the SRS transmission symbol, the new column set for the HARQ-ACK may be configured as {3, 8, 9} or {2, 3, 8} in case of a normal CP, and may be configured as { 2, 6, 7} or {1, 2, 6} in case of an extended CP.

If at least one of the configured channel sensing operation and the SRS transmission operation is not performed on the symbol on which the at least one operation is performed and the same symbol on which the UCI transmission is performed, the terminal may apply a column set composed of the four symbols, whereas if the at least one of the configured channel sensing operation and the SRS transmission operation is performed on the symbol on which the at least one operation is performed and the same symbol on which the UCI transmission is performed, the terminal may apply a column set composed of the three symbols. In this case, the base station may be defined with the terminal to use one of the column sets composed of four symbols and three symbols, or can also apply the configured column set regardless of the symbol on which at least one of the configured channel sensing operation and the SRS transmission operation is performed through configuration of an upper signal and whether the UCI transmission is performed on the same symbol.

Method 2 will be described in more detail as follows. The terminal, which requires the UCI transmission in the PUSCH transmission subframe configured from the base station, is configured to perform the SRS transmission operation in the PUSCH transmission subframe, and in this case, if the symbol on which the configured SRS transmission operation is performed is equal to at least one of symbols on which at least one piece of UCI information (e.g., RI or HARQ-ACK) is transmitted, the terminal does not transmit the SRS on the symbol, but transmits the UCI information. For example, as illustrated in FIG. 7A, if the terminal, in which the SRS transmission is configured on the second symbol of the uplink subframe, requires the UCI transmission (e.g., RI) in the subframe, in other words, if the configured SRS transmission and the UCI information transmission are performed on the same symbol, the terminal may transmit the UCI without transmitting the SRS. In case of transmitting CQI/PMI information of the UCI information, the CQI/PMI information may be transmitted using the symbol on which the above-described configured PUSCH is determined effective. That is, in the present disclosure, since the SRS is not transmitted during calculation of the symbol on which the above-described PUSCH can be transmitted, the symbol on which the SRS transmission is configured should not be subtracted in the calculation.

Method 3 will be described in more detail as follows. The terminal, which requires the UCI transmission in the PUSCH transmission subframe configured from the base station, is configured to perform at least the channel sensing operation in the PUSCH transmission subframe, and in this case, if the symbol on which the configured channel sensing operation is performed is equal to at least one of symbols on which at least one piece of UCI information (e.g., RI or HARQ-ACK) is transmitted, the terminal does not transmit the UCI information on the symbol, but performs the channel sensing operation. In this case, if the symbol on which the channel sensing operation is performed is equal to at least one of symbols on which at least one piece of UCI information (e.g., RI or HARQ-ACK) is transmitted, the terminal can transmit the UCI information without performing the channel sensing operation on the symbol.

More specifically, if the terminal is configured to perform the channel sensing operation on symbol indexes 12 and 13 in the uplink subframe in which the PUSCH transmission is configured, or is to perform the UCI transmission in the subframe configured not to perform the PUSCH transmission on the symbol indexes 12 and 13, the terminal may not perform the channel sensing operation on the symbol index 12 during the configured channel sensing operation, but may transmit the UCI information (i.e., in case of a normal CP, it may be RI and CQI and/or PMI). If the terminal is to perform the channel sensing operation on symbol indexes 0 and 1 in the uplink subframe in which the PUSCH transmission is configured, or is to perform the UCI transmission in the subframe configured not to perform the PUSCH transmission on the symbol indexes 0 and 1, the terminal may perform the channel sensing operation on the symbol index 0 during the configured channel sensing operation, and if it is determined that the channel is an idle channel, the terminal may transmit the configured UCI information (i.e., in case of a normal CP, it may be RI and CQI and/or PMI) on symbol index 1.

In the present disclosure, although it is described that if the UCI transmission is required in the PUSCH transmission subframe configured from the base station, the terminal is configured to perform at least one of the channel sensing operation and the SRS transmission operation in the configured PUSCH transmission subframe in a case where the symbol on which the at least one of the configured channel sensing operation and the SRS transmission operation is performed is equal to the at least one of symbols on which the at least one piece of UCI information (e.g., RI or HARQ-ACK) is transmitted, it is also possible to apply the method described in the present disclosure even to a case where the subframe in which the at least one of the channel sensing operation and the SRS transmission operation is configured to be performed is equal to the subframe in which the at least one piece of UCI information (e.g., RI or HARQ-ACK) is transmitted.

Further, if one piece of uplink transmission configuration information (uplink DCI format 0 or 4 or one of DCI formats newly introduced for the uplink transmission configuration in LAA SCell) that the terminal receives from the base station through PDCCH is effective in one or more uplink subframes, or if one piece of uplink transmission configuration information configures transmission in one or more uplink subframes, the base station may configure the terminal to perform at least one of the channel sensing operation, the SRS transmission operation, and the UCI transmission operation in one or more different subframes in which the uplink transmission is configured. For example, if the SRS transmission configuration is included in the uplink transmission configuration information in case where one uplink transmission configuration configures transmission in one or more uplink subframes of the terminal, the terminal may perform the SRS transmission in one subframe in which the UCI transmission is not configured among the plurality of configured subframes in which PUSCH transmission can be performed through determination of an idle channel.

For example, in FIG. 5, it is assumed that the terminal, which is configured to be able to perform transmission of a plurality of uplinks with one piece of uplink transmission configuration information, configures the uplink transmission from subframe n+4 to subframe n+7 through uplink transmission configuration information received through the PDCCH of the base station in subframe n and also configures the SRS transmission. If the terminal determines that the channel is in an idle state through the channel sensing operation performed for transmission of the subframe n+4, and configures transmission of the UCI information in subframe n+4, the terminal may include the UCI in the PUSCH on which transmission is configured in the subframe n+4 to be transmitted, and may transmit the SRS in one of subframes n+5, n+6, and n+7.

Specifically, the terminal may be configured to perform SRS transmission in the first subframe (e.g., subframe n+5) among the subframes in which the UCI transmission is not configured among the plurality of uplink subframes in which the PUSCH transmission can be performed through determination of an idle channel, or to perform the transmission in the last subframe (e.g., subframe n+7). If the uplink transmission configuration information received through the PDCCH of the base station in subframe n configures the uplink transmission from subframe n+4 to subframe n+7 and the SRS transmission is configured together, or if the terminal is unable to determine that the channel is in an idle state through the channel sensing operation performed to transmit the subframe n+4, but determines that the channel is in an idle state in subframe n+5, the terminal may perform the SRS transmission in the first subframe (e.g., subframe n+5) among the subframes in which the UCI transmission is not configured among the subframes in which the configured PUSCH transmission can be performed, or may be configured to transmit the SRS in the last subframe (e.g., subframe n+7), without transmitting the UCI information configured to transmit the UCI information in subframe n+4. In this case, for the SRS transmission and channel sensing operation, the location of the symbol on which uplink signal transmission, such as PUCCH or PUSCH, is not configured may be configured as illustrated in FIGS. 7A and 7B.

Further, if it is defined that the SRS transmission is performed in the first subframe in which the channel is determined to be in an idle state through the channel sensing operation among the configured uplink subframes in case where the terminal, which is configured to be able to perform transmission of a plurality of uplinks with one piece of uplink transmission configuration information, configures the uplink transmission from subframe n+4 to subframe n+7 through uplink transmission configuration information received through the PDCCH of the base station in subframe n and also configures the SRS transmission, it may be determined that the channel is in an idle state and the UCI information may not be transmitted in the subframe in which the SRS transmission is performed. For example, if the terminal is unable to determine that the channel is in an idle state through the channel sensing operation performed to transmit subframe n+4, but determines that the channel is in an idle state in subframe n+5 in case where the uplink transmission configuration information received through the PDCCH of the base station in subframe n configures the uplink transmission from subframe n+4 to subframe n+7, the SRS transmission is configured, and the UCI information transmission is configured in subframe n+5, the terminal may transmit the SRS in subframe n+5 determined as the first idle channel among the configured uplink subframes without transmitting the UCI information configured to be transmitted in subframe n+5. In this case, the terminal may perform the UCI transmission in the first subframe (e.g., subframe n+6) among the subframes in which the SRS transmission is not configured among the subframes that can perform the PUSCH transmission, or may be configured to transmit the UCI in the last subframe (e.g., subframe n+7).

Figure 8:
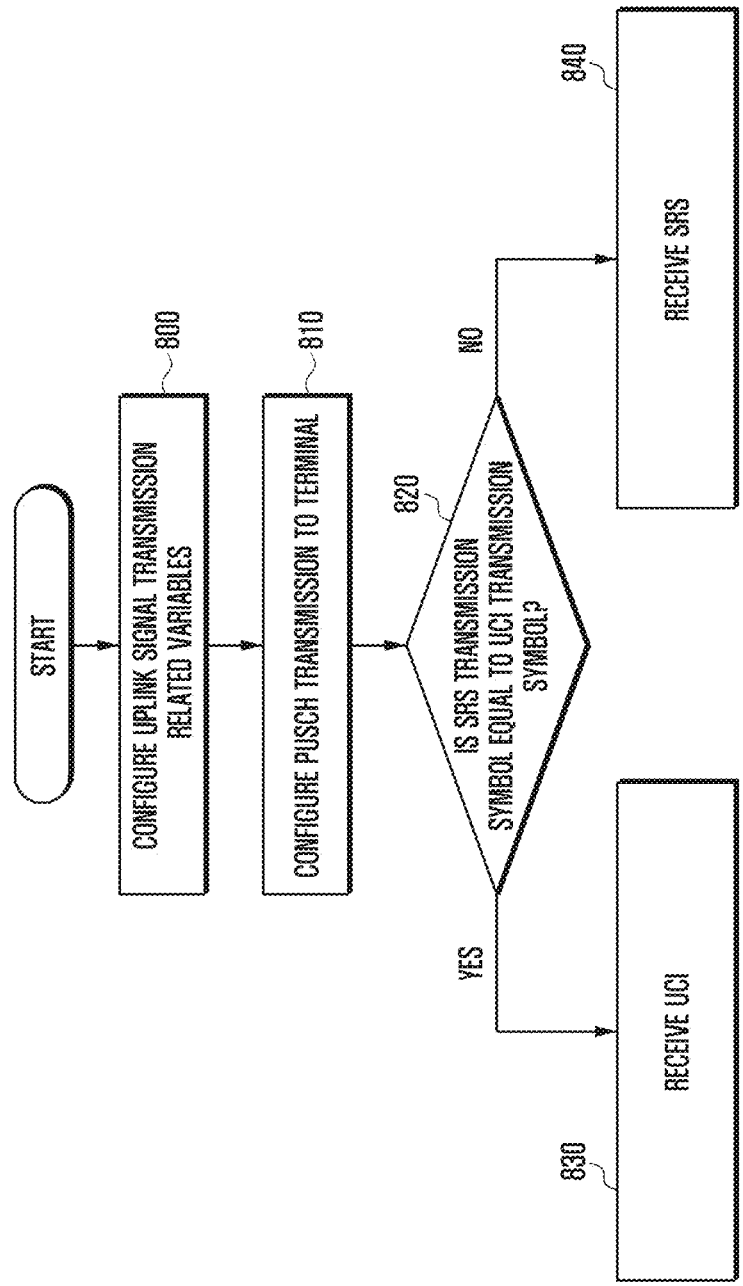
FIG. 8 is a flowchart illustrating a base station operation method for receiving UCI information.

FIG. 8 is a flowchart explaining a base station operation according to an embodiment of the present disclosure.

Referring to FIG. 8, the base station, at operation 800, may configure one or more uplink transmissions in accordance with capabilities of the base station and the terminal. In this case, the uplink transmission configuration may include simultaneous transmission of HARQ-ACK and SRS, SRS transmission symbol location, the number and the location of symbols on which uplink signal transmission is not permitted for a channel sensing operation in a subframe, the number of uplink subframes configured through one uplink transmission configuration, and information on uplink transmission configuration to LAA SCell including a new UCI transmission method. At operation 810, the base station may transmit uplink transmission configuration information to the terminal so as to perform uplink transmission to the terminal in one or more uplink subframes including subframe n+K (K is a value that is equal to or larger than 4) in subframe n. In this case, the uplink transmission configuration information may include at least one piece of uplink transmission configuration information disclosed in the present disclosure, such as SRS transmission configuration, aperiodic CSI report request, and the number of symbols on which uplink signal transmission is not permitted for the channel sensing operation in the subframe. The base station determines whether an SRS transmission symbol and partial UCI (e.g., RI or HARQ-ACK) of UCI information of the terminal are generated on the same symbol in the uplink transmission subframe configured in accordance with the uplink transmission configuration information (operation 820), and if they are generated on the same symbol, the base station expects that the terminal transmits a signal including at least UCI information without transmitting the SRS in the corresponding subframe, and receives an UCI signal of the terminal (operation 830). If the SRS transmission symbol and the partial UCI (e.g., RI or HARQ-ACK) of the UCI information of the terminal are not generated on the same symbol in the uplink transmission subframe configured in accordance with the uplink transmission configuration information, the base station expects that the terminal transmits the uplink signal configured to include at least the SRS in the corresponding subframe, and receives the SRS signal of the terminal (operation 840). The contents of FIG. 8 can be modified according to an embodiment of the present disclosure to be applicable to the base station.

Figure 9:
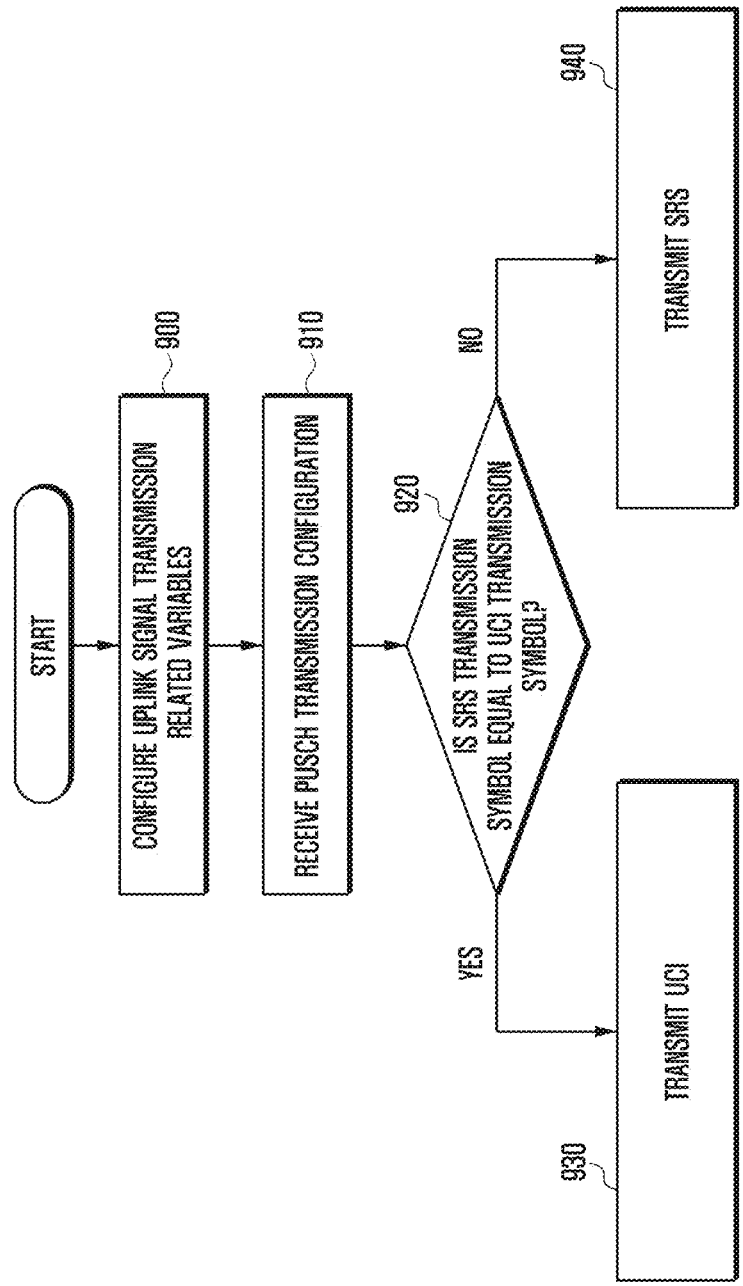
FIG. 9 is a flowchart illustrating a terminal operation method for transmitting UCI information.

FIG. 9 is a flowchart explaining a terminal operation according to an embodiment of the present disclosure.

Referring to FIG. 9, the terminal, at operation 900, may receive configuration of one or more uplink transmissions from the base station in accordance with capabilities of the base station and the terminal. In this case, the uplink transmission configuration may include simultaneous transmission of HARQ-ACK and SRS, SRS transmission symbol location, the number and the location of symbols on which uplink signal transmission is not permitted for a channel sensing operation in a subframe, the number of uplink subframes configured through one uplink transmission configuration, and information on uplink transmission configuration to LAA SCell including a new UCI transmission method. At operation 910, the terminal may receive uplink transmission configuration information from the base station so as to perform uplink transmission in one or more uplink subframes including subframe n+K (K is a value that is equal to or larger than 4) in subframe n. In this case, the uplink transmission configuration information may include at least one piece of uplink transmission configuration information disclosed in the present disclosure, such as SRS transmission configuration, aperiodic CSI report request, and the number of symbols on which uplink signal transmission is not permitted for the channel sensing operation in the subframe. The terminal determines whether an SRS transmission symbol and partial UCI (e.g., RI or HARQ-ACK) of UCI information to be transmitted by the terminal are generated on the same symbol in the uplink transmission subframe configured in accordance with the uplink transmission configuration information (operation 920), and if they are generated on the same symbol, the terminal transmits a signal including at least UCI information without transmitting the SRS in the corresponding subframe (operation 930). If the SRS transmission symbol and the partial UCI (e.g., RI or HARQ-ACK) of the UCI information to be transmitted by the terminal are not generated on the same symbol in the uplink transmission subframe configured in accordance with the uplink transmission configuration information, the terminal transmits the uplink signal including at least the SRS in the corresponding subframe (operation 940). The contents of FIG. 9 can be modified according to an embodiment of the present disclosure to be applicable to the terminal.

Figure 10:
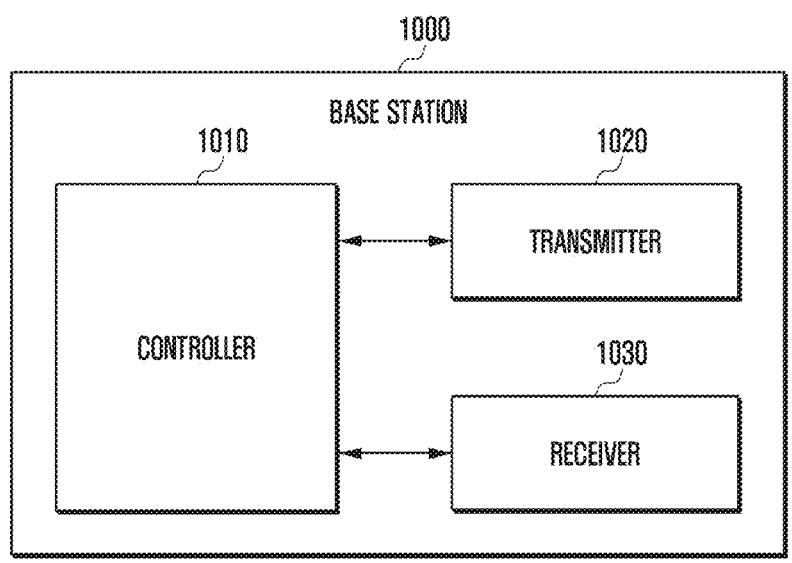
FIG. 10 is a diagram illustrating a base station device according to embodiments of the present disclosure.

FIG. 10 is a diagram illustrating a base station device according to embodiments of the present disclosure.

A receiver 1030 of a base station 1000 may receive signals from another base station or a terminal and may measure channels from the base station or the terminal. Further, the receiver may sense unlicensed band channels using setting values for the channel sensing operation that is configured through a base station controller 1010. Further, when occupying the unlicensed band, the receiver may determine the transmission power that can be transmitted in the unlicensed band. The base station controller 1010 may determine whether the unlicensed band is in an idle state using information on the unlicensed band that is sensed by the receiver 1030. If the unlicensed band is determined to be in an idle state, the base station controller 1010 may transmit a signal for channel occupation in a transmitter 1020 of the base station, control channel and data channel information for a specific terminal, or configuration information on the transmission power of an LAA cell. Further, the controller 1010 may control the receiver 1030 to correctly receive the UCI transmission of the terminal through which at least one of the UCI information, UCI transmission cell, and UCI transmission channel may be changed in accordance with the PUSCH transmission configuration in the licensed band or unlicensed band at UCI information transmission time of the terminal.

If the determined unlicensed band is not in an idle state, the base station controller 1010 may be configured to continuously perform the channel sensing operation through the base station receiver 1030. The base station controller 1010 may determine a part or the whole of parameters which include control channel transmission parameter configuration, such as PDCCH/EPDCCH for a specific terminal, various kinds of reference signal transmission parameter configuration, PDSCH/DPDSCH scheduling information, CRS, CSI-RS, DRS, and PDSCH that are required for configuration or transfer between the base station and the terminal. Further, the base station controller 1010 may configure cells that operate in one or more of different bands, that is, the licensed band and the unlicensed band, in accordance with the capabilities of the base station and the terminal to the terminal, and may configure PUCCH and PUSCH simultaneous transmission.

Figure 11:
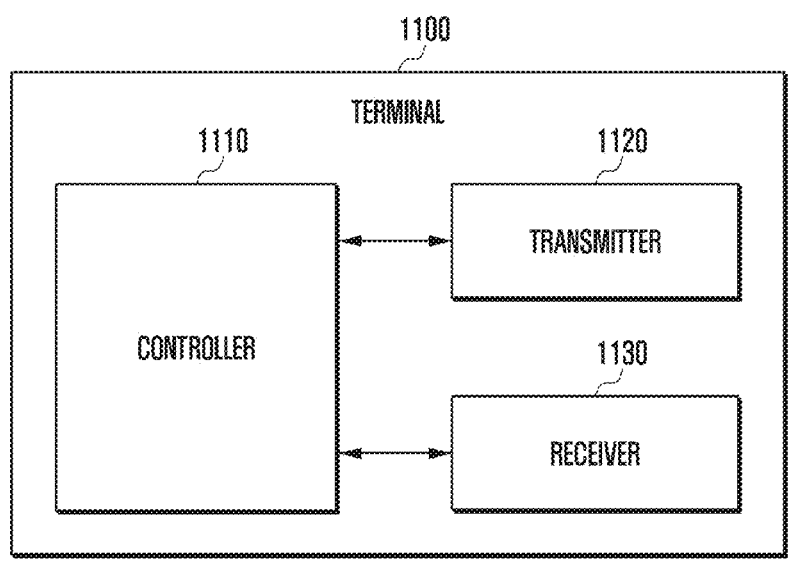
FIG. 11 is a diagram illustrating a terminal device according to embodiments of the present disclosure.

FIG. 11 is a diagram illustrating a terminal device according to embodiments of the present disclosure.

Referring to FIG. 11, a controller 1110 of a terminal 1100 controls a receiver 1130 to receive configuration information between the base station and the terminal for signal transmission in a licensed band and an unlicensed band from the base station, and uses the unlicensed band in accordance with the received configuration values. Further, the controller may receive a first signal transmittable time, a second signal transmittable time, and the signal configuration from the base station through the receiver 1130 of the terminal, or may receive configuration of the channel occupation period of the LAA cell or determination methods for the last partial subframe. Further, the terminal 1100 may receive configuration information on the transmission power in the channel occupation period of the LAA cell from the base station through the receiver 1130. The controller 1110 may acquire status information of the corresponding unlicensed band suing at least one of a configuration value for determining whether scheduling can be performed in a subframe that performs the channel sensing operation that is configured by the base station and is received through the receiver 1130, a configuration value for a signal that is transmitted to a channel occupation start symbol of the base station, unlicensed band status information that can be transmitted by the base station to the terminal using the licensed band or another unlicensed band, and transmission power configuration information in the channel occupation period of the LAA cell, and may receive a signal from the unlicensed band. Further, the controller 1110 may determine whether to occupy the channel of the LAA cell using the second signal transmission that is received and detected from the LAA cell. Further, the controller 1110 may determine the length of the last partial subframe of the LAA cell using at least one of the first or second signal transmittable time that is configured from the LAA cell and the channel occupation period of the LAA cell. Further, the controller 1110 may determine the result of receiving a data signal that is received from the base station, and may report the result of data reception to the base station through the transmitter 1120. Further, the controller 1110 may control the receiver 1130 to receive a correct signal using the transmission power for the channel occupation period of the LAA cell that is received from the LAA cell. Further, the controller 1110 may include a decoder that receives PDCCH/EPDCCH and PDSCH through the receiver 1130 and decodes the PDSCH. Further, in accordance with the PUSCH transmission configuration in the licensed band or the unlicensed band at the UCI information transmission time of the terminal, the controller 1110 may transmit the UCI of the terminal through the transmitter 1120 by changing at least one of the UCI information, UCI transmission cell, and a UCI transmission channel depending on whether to configure the PUSCH transmission in the licensed band or unlicensed band at the UCI information transmission time of the terminal.

The invention claimed is:

1. A method performed by a terminal in a communication system, the method comprising:
receiving sounding reference signal (SRS) configuration information for transmitting an SRS;
receiving uplink transmission configuration information for transmitting a signal in an unlicensed band, the uplink transmission configuration information including information on a channel sensing period and configuration information for the terminal to transmit uplink data;
determining that a symbol configured to transmit the SRS or a symbol in the channel sensing period overlaps a symbol for transmitting uplink control information included in the uplink data to be transmitted based on the SRS configuration information and the uplink transmission configuration information; and
transmitting, using a set of symbols that exclude the symbol configured to transmit the SRS and the symbol in the channel sensing period from symbols of an uplink subframe, the uplink data and the uplink control information included in the uplink data on a physical uplink shared channel (PUSCH) based on a determination result,
wherein the uplink control information includes an rank indicator (RI), and
wherein symbols configured to transmit the RI in the uplink subframe are based on a column set {4, 7, 10} for a normal cyclic prefix (CP) or a column set {3, 5, 8} for an extended CP.

2. The method of claim 1, further comprising:
transmitting the SRS on the symbol configured to transmit the SRS that overlaps the symbol for transmitting the uplink control information.

3. The method of claim 1, further comprising:
performing a channel sensing operation on the symbol in the channel sensing period that overlaps the symbols for transmitting the uplink control information.

4. The method of claim 1, wherein the SRS is configured to be transmitted on a second symbol of the uplink subframe.

5. A method performed by a base station in a communication system, the method comprising:
transmitting sounding reference signal (SRS) configuration information for receiving an SRS;
transmitting uplink transmission configuration information for receiving a signal in an unlicensed band, the uplink transmission configuration information including information on a channel sensing period and configuration information for a terminal in the communication system to receive uplink data;
determining that a symbol configured to receive the SRS or a symbol in the channel sensing period overlaps a symbol for receiving uplink control information included in the uplink data to be received according to the SRS configuration information and the uplink transmission configuration information; and
receiving, using a set of symbols that exclude the symbol configured to transmit the SRS and the symbol in the channel sensing period from symbols of an uplink subframe, the uplink data and the uplink control information included in the uplink data based on a determination result,
wherein the uplink control information includes an rank indicator (RI), and
wherein symbols configured to transmit the RI in the uplink subframe are based on a column set {4, 7, 10} for a normal cyclic prefix (CP) or a column set {3, 5, 8} for an extended CP.

6. The method of claim 5, further comprising:
receiving the SRS on the symbol configured to receive the SRS that overlaps the symbols for receiving the uplink control information.

7. The method of claim 5, wherein the SRS is configured to be received on a second symbol of the uplink subframe.

8. A terminal in a communication system, the terminal comprising:
a transceiver configured to transmit and receive signals with a base station in the communication system; and
a controller comprising a processor configured to:
receive, via the transceiver, sounding reference signal (SRS) configuration information for transmitting an SRS,
receive, via the transceiver, uplink transmission configuration information for transmitting a signal in an unlicensed band, the uplink transmission configuration information including information on a channel sensing period and configuration information for the terminal to transmit uplink data,
determine that a symbol configured to transmit the SRS or a symbol in the channel sensing period overlaps a symbol for transmitting uplink control information included in the uplink data to be transmitted based on the SRS configuration information and the uplink transmission configuration information, and transmit, via the transceiver, using a set of symbols that exclude the symbol configured to transmit the SRS and the symbol in the channel sensing period from symbols of an uplink subframe, the uplink data and the uplink control information included in the uplink data on a physical uplink shared channel (PUSCH) based on a determination result, wherein the uplink control information includes an rank indicator (RI), and wherein symbols configured to transmit the RI in the uplink subframe are based on a column set {4, 7, 10} for a normal cyclic prefix (CP) or a column set {3, 5, 8} for an extended CP.

9. The terminal of claim 8, wherein the processor is further configured to transmit the SRS on the symbols configured to transmit the SRS that overlaps the symbol for transmitting the uplink control information.

10. The terminal of claim 8, wherein the processor is further configured to perform a channel sensing operation on the symbol in the channel sensing period that overlaps the symbols for transmitting the uplink control information.

11. A base station in a communication system, the base station comprising:
   a transceiver configured to transmit and receive signals with a terminal in the communication system; and
   a controller comprising a processor configured to:
      transmit, via the transceiver, sounding reference signal (SRS) configuration information for receiving an SRS,
      transmit, via the transceiver, uplink transmission configuration information for receiving a signal in an unlicensed band, the uplink transmission configuration information including information on a channel sensing period and configuration information for the terminal to receive uplink data,
      determine that a symbol configured to transmit the SRS or a symbol in the channel sensing period overlaps a symbol for transmitting uplink control information included in the uplink data to be transmitted according to the SRS configuration information and the uplink transmission configuration information, and
      receive, via the transceiver using a set of symbols that exclude the symbol configured to transmit the SRS and the symbol in the channel sensing period from symbols of an uplink subframe, the uplink data and the uplink control information included in the uplink data from symbols of the uplink subframe based on a determination result,
   wherein the uplink control information includes an rank indicator (RI), and
   wherein symbols configured to transmit the RI in the uplink subframe are based on a column set {4, 7, 10} for a normal cyclic prefix (CP) or a column set {3, 5, 8} for an extended CP.

12. The base station of claim 11, wherein the processor is further configured to receive the SRS on the symbol configured to receive the SRS that overlaps the symbols for receiving the uplink control information.

13. The base station of claim 11, wherein the SRS is configured to be received on a second symbol of the uplink subframe.

* * * * *